(12) United States Patent
Nishino

(10) Patent No.: US 9,434,448 B2
(45) Date of Patent: Sep. 6, 2016

(54) BICYCLE DERAILLEUR

(71) Applicant: SHIMANO INC., Sakai (JP)

(72) Inventor: Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/529,426

(22) Filed: Oct. 31, 2014

(65) Prior Publication Data

US 2016/0121967 A1 May 5, 2016

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/137* | (2010.01) |
| *B62M 9/1342* | (2010.01) |

(52) U.S. Cl.
CPC ........... *B62M 9/137* (2013.01); *B62M 9/1342* (2013.01)

(58) Field of Classification Search
CPC .. B62M 9/1342; B62M 9/136; B62M 9/137; B62M 9/1344; B62M 9/135
USPC ..................................... 474/82, 80
See application file for complete search history.

(56) References Cited

U.S. PATENT DOCUMENTS

| | | | | |
|---|---|---|---|---|
| 5,496,222 A | * | 3/1996 | Kojima ................ | B62M 9/1342 474/80 |
| 5,620,384 A | * | 4/1997 | Kojima ................ | B62M 9/1342 474/123 |
| 5,624,336 A | * | 4/1997 | Kojima ................ | B62M 9/1342 474/82 |
| 5,649,877 A | * | 7/1997 | Patterson ............ | B62M 9/1344 474/80 |
| 5,728,018 A | * | 3/1998 | Terada ................. | B62M 9/1344 474/127 |
| 5,779,580 A | * | 7/1998 | White .................. | B62M 9/1342 474/80 |
| 5,779,581 A | * | 7/1998 | Fujii ..................... | B62M 9/136 474/80 |
| 5,816,966 A | * | 10/1998 | Yang ..................... | B62M 9/137 474/82 |
| 6,099,425 A | * | 8/2000 | Kondo ................. | B62M 9/1342 474/127 |
| 6,234,927 B1 | * | 5/2001 | Peng .................... | B62M 9/1342 474/80 |
| 6,341,538 B1 | * | 1/2002 | Takachi ................ | B62M 9/137 188/24.19 |
| 6,482,115 B2 | * | 11/2002 | Takachi ................ | B62M 9/137 188/24.19 |

(Continued)

FOREIGN PATENT DOCUMENTS

EP        1798143 B1     6/2007

*Primary Examiner* — Henry Liu

(74) *Attorney, Agent, or Firm* — Mori & Ward, LLP

(57) ABSTRACT

A bicycle derailleur comprises a base member, a chain guide, a first link, and a wire guide. The base member is configured to be coupled to a bicycle frame. The chain guide is configured to guide a bicycle chain. The first link is configured to couple the chain guide to the base member so that the chain guide is movable relative to the base member between a retracted position and an extended position. The wire guide includes only one wire guiding portion configured to guide an inner wire of a control cable which is in at least one of a top pull arrangement and a bottom pull arrangement. The wire guide is a separate member from the first link and configured to be attached to the first link.

20 Claims, 17 Drawing Sheets

(56) References Cited

U.S. PATENT DOCUMENTS

| | | | | |
|---|---|---|---|---|
| 6,491,597 B2* | 12/2002 | Chen | B62M 9/1342 | 474/80 |
| 6,629,903 B1* | 10/2003 | Kondo | B62M 9/136 | 474/80 |
| 6,695,729 B2* | 2/2004 | Ozaki | B62M 9/1344 | 474/80 |
| 6,923,740 B2* | 8/2005 | Nanko | B62M 9/1342 | 474/78 |
| 6,962,544 B2* | 11/2005 | Nanko | B62M 9/1342 | 285/15 |
| 7,014,584 B2* | 3/2006 | Nanko | B62M 9/1342 | 474/80 |
| 7,189,173 B2* | 3/2007 | Tsai | B62M 9/1342 | 474/82 |
| 7,438,657 B2* | 10/2008 | Nakai | B62M 9/1342 | 474/80 |
| 7,722,486 B2* | 5/2010 | Nanko | B62M 9/136 | 474/103 |
| 7,762,916 B2* | 7/2010 | Ichida | B62M 9/132 | 474/78 |
| 7,867,118 B2* | 1/2011 | Yamamoto | B62M 9/136 | 474/80 |
| 7,914,407 B2* | 3/2011 | Fukushima | B62M 9/1342 | 474/80 |
| 8,337,343 B2* | 12/2012 | Lin | F16H 7/22 | 474/78 |
| 8,485,924 B2* | 7/2013 | Fujii | B62M 9/136 | 285/15 |
| 8,491,428 B2* | 7/2013 | Emura | B62M 9/136 | 474/3 |
| 8,663,043 B2* | 3/2014 | Auer | B62M 9/137 | 474/82 |
| 8,777,788 B2* | 7/2014 | Kawakami | B62M 9/1344 | 474/80 |
| 2002/0165054 A1* | 11/2002 | Chen | B62M 9/1342 | 474/82 |
| 2003/0022744 A1* | 1/2003 | Tsai | B62M 9/1342 | 474/80 |
| 2003/0083161 A1* | 5/2003 | Ozaki | B62M 9/1342 | 474/80 |
| 2003/0100393 A1* | 5/2003 | Nanko | B62M 9/1342 | 474/80 |
| 2004/0005950 A1* | 1/2004 | Tetsuka | B62M 25/02 | 474/80 |
| 2004/0005951 A1* | 1/2004 | Tsai | B62M 9/1342 | 474/80 |
| 2004/0127314 A1* | 7/2004 | Nanko | B62M 9/1342 | 474/80 |
| 2004/0157690 A1* | 8/2004 | Nankou | B62M 9/1348 | 474/80 |
| 2004/0166973 A1* | 8/2004 | Nanko | B62M 9/1342 | 474/80 |
| 2007/0135249 A1* | 6/2007 | Nanko | B62M 9/136 | 474/80 |
| 2007/0178998 A1* | 8/2007 | Tetsuka | B62M 9/1342 | 474/80 |
| 2007/0298920 A1* | 12/2007 | Nakai | B62M 9/1342 | 474/80 |
| 2008/0004142 A1* | 1/2008 | Nakai | B62M 9/1342 | 474/80 |
| 2008/0026888 A1* | 1/2008 | Yamamoto | B62M 9/1342 | 474/80 |
| 2008/0182689 A1* | 7/2008 | Fujii | B62M 9/136 | 474/82 |
| 2008/0300076 A1* | 12/2008 | Fukushima | B62M 9/1342 | 474/80 |
| 2014/0274507 A1* | 9/2014 | Wickliffe | B62M 9/1344 | 474/80 |

* cited by examiner

BICYCLE DERAILLEUR

BACKGROUND OF THE INVENTION

1. Field of the Invention

The present invention relates to a bicycle derailleur.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle derailleur. The bicycle derailleur laterally shifts a bicycle chain to change gears of the bicycle. A front derailleur and a rear derailleur are known as the bicycle derailleur.

SUMMARY OF THE INVENTION

In accordance with a first aspect of the present invention, a bicycle derailleur comprises a base member, a chain guide, a first link, and a wire guide. The base member is configured to be coupled to a bicycle frame. The chain guide is configured to guide a bicycle chain. The first link is configured to couple the chain guide to the base member so that the chain guide is movable relative to the base member between a retracted position and an extended position. The wire guide includes only one wire guiding portion configured to guide an inner wire of a control cable which is in at least one of a top pull arrangement and a bottom pull arrangement. The wire guide is a separate member from the first link and configured to be attached to the first link.

In accordance with a second aspect of the present invention, the bicycle derailleur according to the first aspect is configured so that the wire guiding portion is configured to guide the inner wire of the control cable which is in one of the top pull arrangement and the bottom pull arrangement.

In accordance with a third aspect of the present invention, the bicycle derailleur according to the second aspect further comprises an additional wire guide including an additional wire guiding portion configured to guide the inner wire of the control cable which is in another of the top pull arrangement and the bottom pull arrangement. The additional wire guide is a separate member from the first link and the wire guide. The additional wire guide is configured to be attached to the first link.

In accordance with a fourth aspect of the present invention, the bicycle derailleur according to the third aspect is configured so that the wire guide and the additional wire guide are configured to be detachably attached to the first link to be replaceable with each other.

In accordance with a fifth aspect of the present invention, the bicycle derailleur according to the first aspect is configured so that the wire guide is configured to be detachably attached to the first link to be replaceable with another wire guide.

In accordance with a sixth aspect of the present invention, the bicycle derailleur according to the first aspect is configured so that the wire guide is configured to be attached to the first link so that the wire guide is disposed at one of a first orientation and a second orientation relative to the first link. The second orientation is different from the first orientation. The wire guiding portion is configured to guide the inner wire of the control cable which is in one of the top pull arrangement and the bottom pull arrangement in a first state where the wire guide is disposed at the first orientation relative to the first link. The wire guiding portion is configured to guide the inner wire of the control cable which is in another of the top pull arrangement and the bottom pull arrangement in a second state where the wire guide is disposed at the second orientation relative to the first link.

In accordance with a seventh aspect of the present invention, the bicycle derailleur according to the sixth aspect is configured so that the first link includes a first end and a second end. The first end is configured to be pivotally coupled to the base member about a first pivot axis. The second end is configured to be pivotally coupled to the chain guide about a second pivot axis. When viewed from an axial direction of the first pivot axis, the wire guiding portion in the first state of the wire guide is disposed on an opposite side of the wire guiding portion in the second state of the wire guide relative to a reference line extending between the first end and the second end.

In accordance with an eighth aspect of the present invention, the bicycle derailleur according to the seventh aspect is configured so that the second orientation is an orientation where the wire guide is turned approximately 180 degree about a rotational axis parallel to the first pivot axis relative to the first link from the first orientation.

In accordance with a ninth aspect of the present invention, the bicycle derailleur according to the sixth aspect is configured so that the wire guide includes a first side and a second side opposite to the first side. The second orientation is an orientation where the wire guide is turned over so that positions of the first side and the second side are replaced relative to the first link.

In accordance with a tenth aspect of the present invention, the bicycle derailleur according to the first aspect is configured so that the wire guiding portion includes a guide hole through which the inner wire is to extend.

In accordance with an eleventh aspect of the present invention, the bicycle derailleur according to the first aspect is configured so that the wire guiding portion includes a guide groove through which the inner wire is to extend.

In accordance with a twelfth aspect of the present invention, a bicycle derailleur comprises a base member, a chain guide, a first link, and a wire guide. The base member is configured to be coupled to a bicycle frame. The chain guide is configured to guide a bicycle chain. The first link is configured to couple the chain guide to the base member so that the chain guide is movable relative to the base member between a retracted position and an extended position. The wire guide is a separate member from the first link. The wire guide is configured to be attached to the first link so that the wire guide is disposed at one of a first orientation and a second orientation relative to the first link. The second orientation is different from the first orientation. The wire guide includes a top-pull wire guiding portion and a bottom-pull wire guiding portion. The top-pull wire guiding portion is configured to guide an inner wire of a control cable in a first state where the wire guide is at the first orientation relative to the first link. The bottom-pull wire guiding portion is configured to guide the inner wire of the control cable in a second state where the wire guide is at the second orientation relative to the first link. The bottom-pull wire guiding portion is different from the top-pull wire guiding portion.

In accordance with a thirteenth aspect of the present invention, the bicycle derailleur according to the twelfth aspect is configured so that the first link includes a first end and a second end. The first end is configured to be pivotally coupled to the base member about a first pivot axis. The second end is configured to be pivotally coupled to the chain guide about a second pivot axis. When viewed from an axial direction of the first pivot axis, the top-pull wire guiding portion and the bottom-pull wire guiding portion are disposed on a first wire side relative to a reference line defined by the first end and the second end in the first state. When viewed from the axial direction of the first pivot axis, the top-pull wire guiding portion and the bottom-pull wire guiding portion are disposed on a second wire side relative to the reference line in the second state. The second wire side is opposite to the first wire side relative to the reference line.

In accordance with a fourteenth aspect of the present invention, the bicycle derailleur according to the twelfth aspect is configured so that the wire guide includes a first side and a second side opposite to the first side. The second orientation is an orientation where the wire guide is turned over so that positions of the first side and the second side are replaced relative to the first link.

In accordance with a fifteenth aspect of the present invention, the bicycle derailleur according to the twelfth aspect is configured so that at least one of the top-pull wire guiding portion and the bottom-pull wire guiding portion includes a guide hole through which the inner wire is to extend.

In accordance with a sixteenth aspect of the present invention, the bicycle derailleur according to the twelfth aspect is configured so that at least one of the top-pull wire guiding portion and the bottom-pull wire guiding portion includes a guide groove through which the inner wire is to extend.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
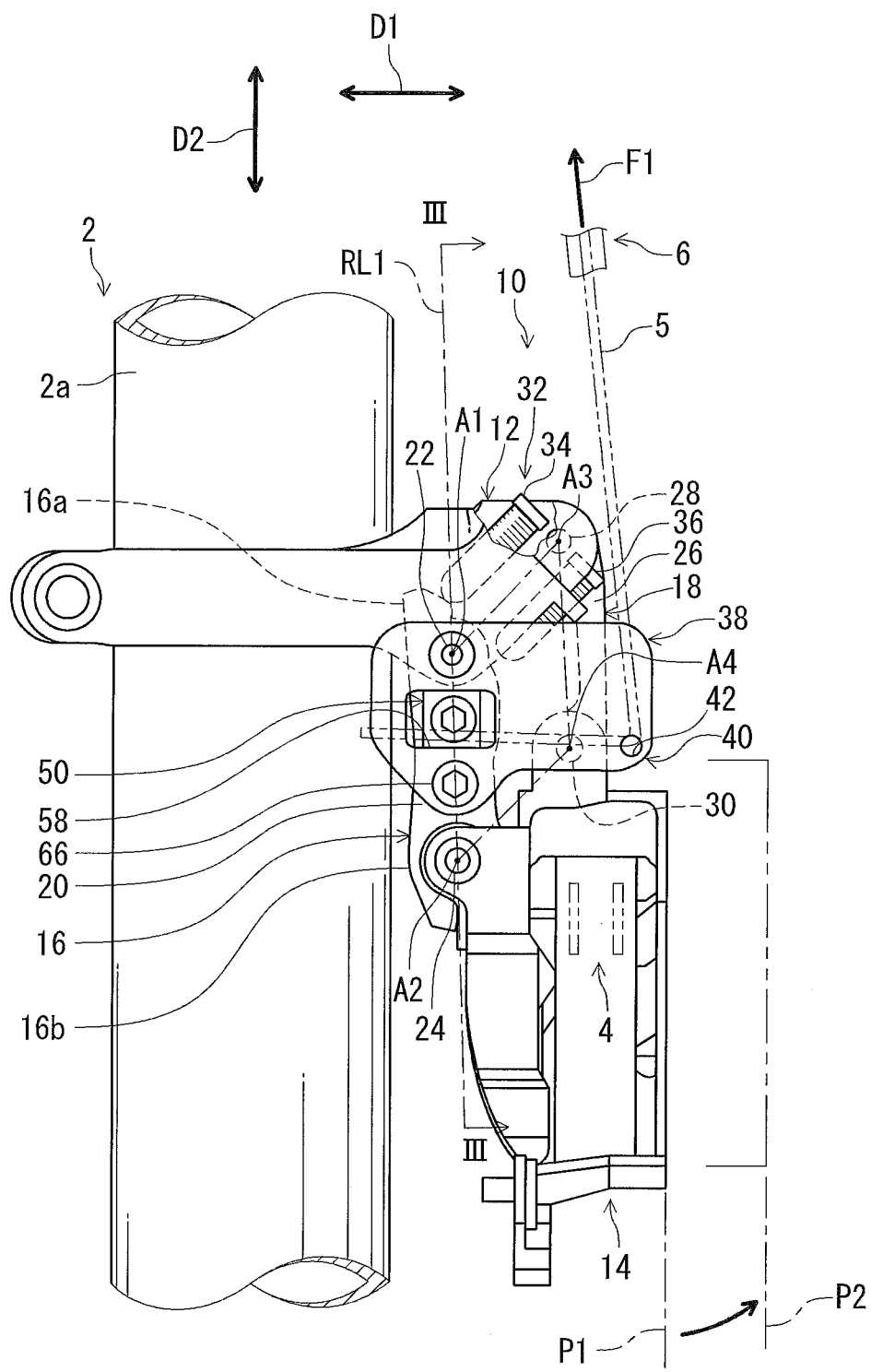
FIG. 1 is a rear side elevational view of a bicycle derailleur in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle derailleur 10 in accordance with a first embodiment comprises a base member 12, a chain guide 14, and a first link 16. The base member 12 is configured to be coupled to a bicycle frame 2. In the illustrated embodiment, the base member 12 is attached to a seat tube 2a of the bicycle frame 2 in a detachable and reinstallable manner. The chain guide 14 is configured to guide a bicycle chain 4. More specifically, the chain guide 14 is configured to shift the bicycle chain 4 in a transverse direction D1 of a bicycle (not shown). The first link 16 is configured to couple the chain guide 14 to the base member 12 so that the chain guide 14 is movable relative to the base member 12 between a retracted position P1 and an extended position P2. The retracted position P1 is closer to the bicycle frame 2 than the extended position P2 in the transverse direction D1, for example.

In this embodiment, the following directional terms "front", "rear", "forward", "rearward", "left", "right", "transverse", "upward" and "downward" as well as any other similar directional terms refer to those directions which are determined on the basis of the rider who sits on a saddle (not shown) of the bicycle (not shown) with facing a handlebar, for example. Accordingly, these terms, as utilized to describe the bicycle derailleur 10, should be interpreted relative to the bicycle as used in an upright riding position on a horizontal surface.

The bicycle derailleur 10 comprises a second link 18 configured to couple the chain guide 14 to the base member 12 so that the chain guide 14 is movable relative to the base member 12 between the retracted position P1 and the extended position P2. While the first link 16 is closer to the bicycle frame 2 than the second link 18 in the transverse direction D1, the first link 16 can be farther from the bicycle frame 2 than the second link 18 in the transverse direction D1 if needed and/or desired. Namely, the positions of the first link 16 and the second link 18 can be replaced with each other. Furthermore, the second link 18 can be omitted from the bicycle derailleur 10 if needed and/or desired.

As seen in FIG. 1, the first link 16 includes a first body 20, a first link pin 22, and a second link pin 24. The first link pin 22 is configured to pivotably connect the first body 20 to the base member 12 about a first pivot axis A1. The second link pin 24 is configured to pivotably connect the first body 20 to the chain guide 14 about a second pivot axis A2. The second link 18 includes a second body 26, a third link pin 28, and a fourth link pin 30. The third link pin 28 is configured to pivotably connect the second body 26 to the base member 12 about a third pivot axis A3. The fourth link pin 30 is configured to pivotably connect the second body 26 to the chain guide 14 about a fourth pivot axis A4.

The first to fourth link pins 22, 24, 28 and 30 provide a four-bar linkage. While the first to fourth pivot axes A1 to A4 are substantially parallel to each other, at least one of the first to fourth pivot axes A1 to A4 can be non-parallel relative to the other axis if needed and/or desired.

While each of the first link pin 22 and the second link pin 24 is a separate member from the first body 20 in the illustrated embodiment, at least one of the first link pin 22 and the second link pin 24 can be integrally provided with the first body 20 as a single unitary member if needed and/or desired. Similarly, while each of the third link pin 28 and the fourth link pin 30 is a separate member from the second body 26 in the illustrated embodiment, at least one of the third link pin 28 and the fourth link pin 30 can be integrally provided with the second body 26 as a single unitary member if needed and/or desired.

The bicycle derailleur 10 includes an adjustment structure 32 configured to adjust the retracted position P1 and the extended position P2. The adjustment structure 32 includes a first adjustment bolt 34 and a second adjustment bolt 36. Each of the first adjustment bolt 34 and the second adjustment bolt 36 is threadedly mounted on the base member 12. The first link 16 is configured to be in contact with the first adjustment bolt 34 in a retracted state where the chain guide 14 is positioned at the retracted position P1. The first link 16 is configured to be in contact with the second adjustment bolt 36 in an extended state where the chain guide 14 is positioned at the extended position P2. The adjustment structure 32 can be omitted from the bicycle derailleur 10 if needed and/or desired. Positions of the first and second adjustment bolts 34 and 36 relative to the base member 12 are adjustable respectively, so as to change contacting points between the first and second adjustment bolts 34 and 36 and the first link 16. In this manner, the retracted position P1 and the extended position P2 are adjustable.

The bicycle derailleur 10 includes a biasing member (not shown) configured to bias the chain guide 14 toward the retracted position P1. The chain guide 14 is positioned at the retracted position P1 by the adjustment structure 32 and the biasing member when an inner wire 5 of a control cable 6 is not pulled.

As seen in FIG. 1, the bicycle derailleur 10 comprises a wire guide 38. The wire guide 38 is a separate member from the first link 16. The wire guide 38 is configured to be attached to the first link 16. The wire guide 38 includes only one wire guiding portion 40 configured to guide the inner wire 5 of the control cable 6 which is in at least one of a top pull arrangement and a bottom pull arrangement.

In the illustrated embodiment, the wire guiding portion 40 is configured to guide the inner wire 5 of the control cable 6 which is in one of the top pull arrangement and the bottom pull arrangement. More specifically, the wire guiding portion 40 is configured to guide the inner wire 5 of the control cable 6 which is in only the top pull arrangement. The wire guiding portion 40 is not configured to guide the inner wire 5 of the control cable 6 which is in the bottom pull arrangement. In the top pull arrangement, the chain guide 14 is moved from the retracted position P1 toward the extended position P2 when the inner wire 5 is upwardly pulled with respect to the wire guiding portion 40 via a shifter (not shown).

As seen in FIG. 1, the wire guiding portion 40 includes a guide hole 42 through which the inner wire 5 is to extend. The wire guiding portion 40 is configured to receive an upwardly pulling force F1 applied to the inner wire 5. The first link 16 pivots relative to the base member 12 about the first pivot axis A1 in response to the upwardly pulling force F1.

Figure 2:
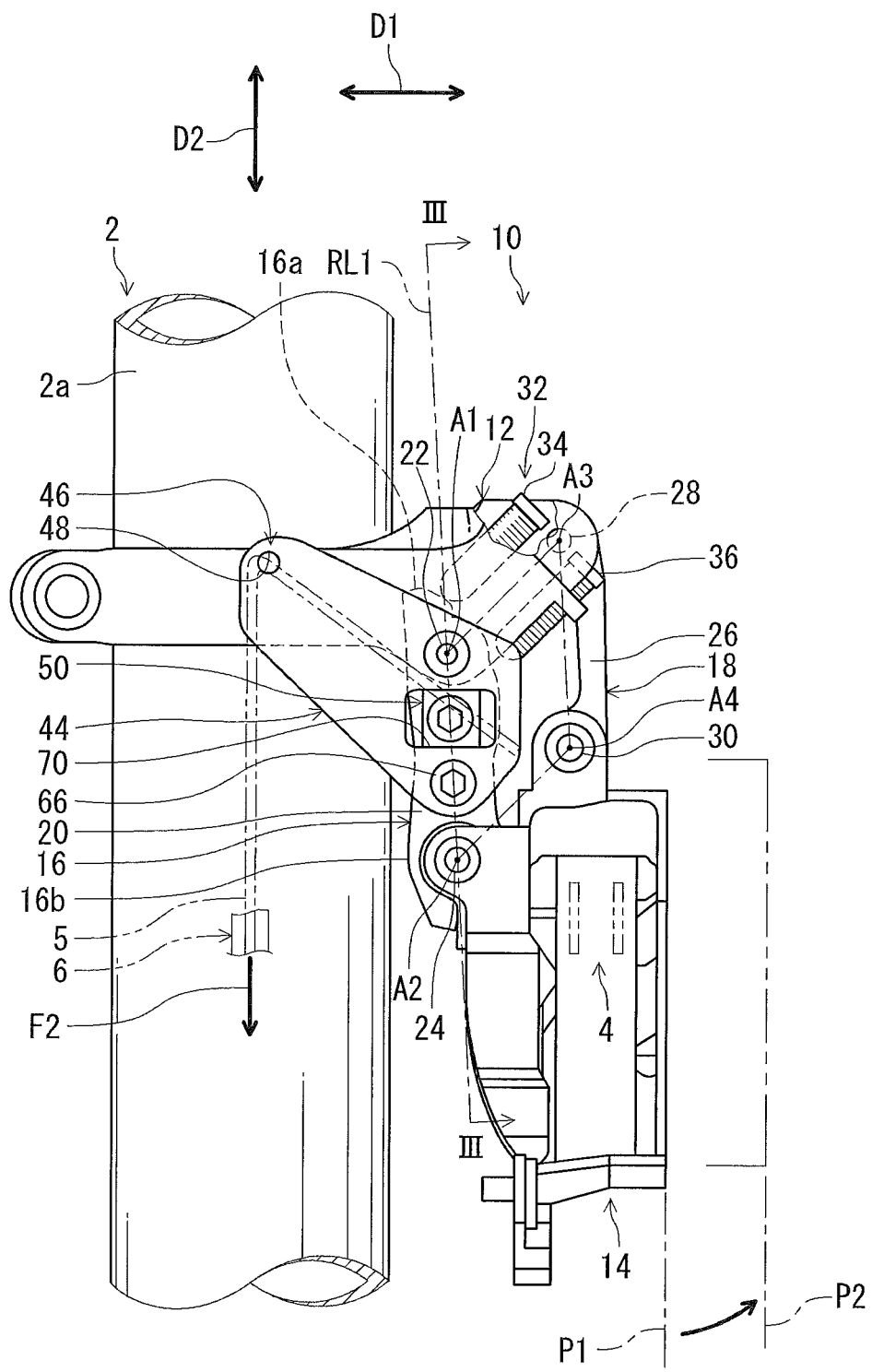
FIG. 2 is a rear side elevational view of the bicycle derailleur in accordance with the first embodiment.

As seen in FIGS. 1 and 2, the wire guide 38 is configured to be detachably attached to the first link 16 to be replaceable with another wire guide. As seen in FIG. 2, the bicycle derailleur 10 further comprises an additional wire guide 44. The additional wire guide 44 is a separate member from the first link 16 and the wire guide 38 (FIG. 1). The additional wire guide 44 is configured to be attached to the first link 16. The wire guide 38 and the additional wire guide 44 can be selectively attached to the first link 16 when the bicycle derailleur 10 is assembled. FIG. 1 illustrates a first attachment state where the wire guide 38 is attached to the first link 16. FIG. 2 illustrates a second attachment state where the additional wire guide 44 is attached to the first link 16.

As seen in FIGS. 1 and 2, in the illustrated embodiment, the wire guide 38 and the additional wire guide 44 are configured to be detachably attached to the first link 16 to be replaceable with each other. However, the wire guide 38 can be non-detachably attached to the first link 16, and the additional wire guide 44 can be non-detachably attached to the first link 16. In a case where the wire guide 38 is non-detachably attached to the first link 16, for example, the wire guide 38 is non-detachable from the first link 16 without destroying a coupling portion between the wire guide 38 and the first link 16. In a case where the additional wire guide 44 is non-detachably attached to the first link 16, the additional wire guide 44 is non-detachable from the first link 16 without destroying a coupling portion between the additional wire guide 44 and the first link 16.

As seen in FIG. 2, the additional wire guide 44 includes an additional wire guiding portion 46 configured to guide the inner wire 5 of the control cable 6 which is in another of the top pull arrangement and the bottom pull arrangement. In the illustrated embodiment, the additional wire guide 44 is configured to guide the inner wire 5 of the control cable 6 which is in only the bottom pull arrangement. The additional wire guide 44 is not configured to guide the inner wire 5 of the control cable 6 which is in the top pull arrangement (FIG. 1). In the bottom pull arrangement, the chain guide 14 is moved from the retracted position P1 toward the extended position P2 when the inner wire 5 is downwardly pulled with respect to the wire guiding portion 46 via the shifter (not shown).

The additional wire guiding portion 46 includes an additional guide hole 48 through which the inner wire 5 is to extend. The additional wire guiding portion 46 is configured to receive a downwardly pulling force F2 applied to the inner wire 5. The first link 16 pivots relative to the base member 12 about the first pivot axis A1 in response to the downwardly pulling force F2.

As seen in FIG. 1, the first link 16 includes a first end 16a and a second end 16b. The first link 16 extends between the first end 16a and the second end 16b. The first end 16a is configured to be pivotally coupled to the base member 12 about the first pivot axis A1. The second end 16b is configured to be pivotally coupled to the chain guide 14 about the second pivot axis A2.

As seen in FIGS. 1 and 2, when viewed from the axial direction of the first pivot axis A1 (a direction perpendicular to a paper surface of each of FIGS. 1 and 2) in the first and second attachment states, the wire guiding portion 40 of the wire guide 38 is disposed on an opposite side of the additional wire guiding portion 46 of the additional wire guide 44 relative to a reference line RL1 extending between the first end 16a and the second end 16b. The reference line RL1 extends to overlap with the first end 16a and the second end 16b. In the illustrated embodiment, when viewed from the axial direction of the first pivot axis A1 in the first and second attachment states, the wire guiding portion 40 of the wire guide 38 is disposed on an opposite side of the additional wire guiding portion 46 of the additional wire guide 44 relative to the first link 16. When viewed from the axial direction of the first pivot axis A1 in the first and second attachment states, the guide hole 42 is provided on an opposite side of the additional guide hole 48 relative to the first link 16. The wire guiding portion 40 can include at least one of a groove, a recess, and a protrusion instead of or in addition to the guide hole 42. The additional wire guiding portion 46 can include at least one of a groove, a recess, and a protrusion instead of or in addition to the additional guide hole 48.

As seen in FIGS. 1 and 2, when viewed from the axial direction of the first pivot axis A1 in the first and second attachment states, the wire guiding portion 40 of the wire guide 38 is farther from the seat tube 2a than the additional wire guiding portion 46 of the additional wire guide 44. Furthermore, when viewed from the axial direction of the first pivot axis A1 in the first and second attachment states, the wire guiding portion 40 of the wire guide 38 is disposed at a position lower than a position of the additional wire guiding portion 46 of the additional wire guide 44 in an axial direction D2 of the seat tube 2a.

In the illustrated embodiment, the first pivot axis A1 is parallel to the second pivot axis A2. In such an embodiment, the reference line RL1 can be defined by the first pivot axis A1 and the second pivot axis A2. The reference line RL1 intersects with the first pivot axis A1 and the second pivot axis A2.

Figure 3:
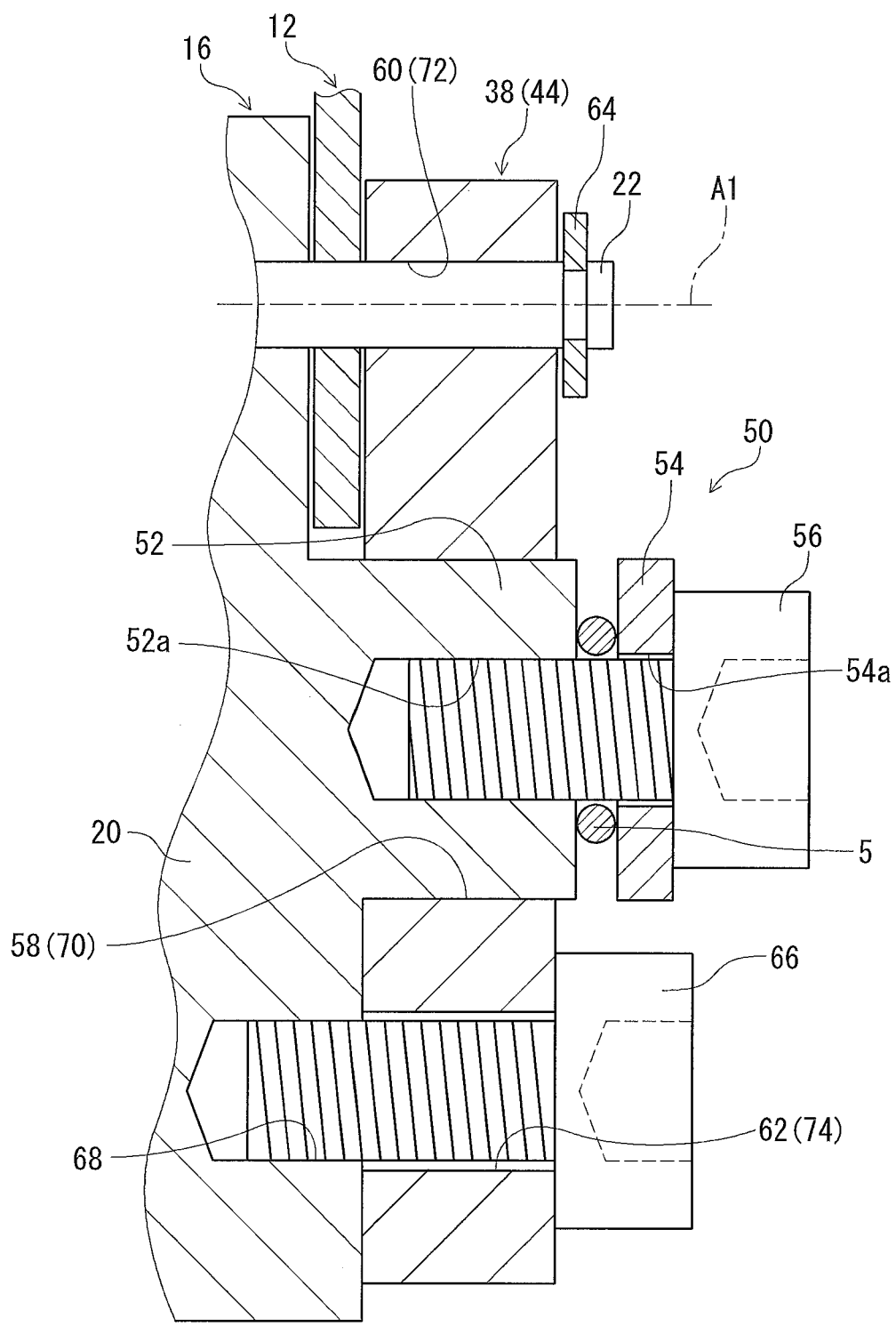
FIG. 3 is a partial cross-sectional view of the bicycle derailleur taken along line III-III of FIGS. 1 and 2.

As seen in FIGS. 1 to 3, the first link 16 includes a wire attachment structure 50. As seen in FIG. 3, the wire attachment structure 50 includes an attachment base portion 52, a washer 54, and a wire attachment bolt 56. The attachment base portion 52 is provided on the first body 20 and protrudes from the first body 20. The attachment base portion 52 includes a threaded hole 52a. The washer 54 includes a through-hole 54a. The wire attachment bolt 56 extends through the through-hole 54a and is threadedly received in the threaded hole 52a. The inner wire 5 is sandwiched between the attachment base portion 52 and the washer 54 so that the inner wire 5 is secure to the first link 16.

As seen in FIGS. 1 and 3, the wire guide 38 includes an engagement opening 58. The attachment base portion 52 is provided in the engagement opening 58 in a state where the wire guide 38 is attached to the first link 16. The wire guide 38 is positioned relative to the first link 16 by the attachment base portion 52 and the engagement opening 58 such that the wire guide 38 moves together with the first link 16 in response to a pulling force via the inner wire 5. The attachment base portion 52 is configured to prevent the wire guide 38 from moving relative to the first link 16.

As seen in FIG. 3, the wire guide 38 includes a pivot hole 60 and an attachment hole 62. The first link pin 22 extends through the pivot hole 60. A snap ring 64 is attached to an end of the first link pin 22. The wire guide 38 is secured to the first body 20 by an attachment bolt 66. The attachment bolt 66 extends through the attachment hole 62 and is threadedly received in a threaded hole 68 of the first body 20. Removing the snap ring 64 and the attachment bolt 66 allows the wire guide 38 to be detached from the first link 16.

As seen in FIGS. 2 and 3, the additional wire guide 44 includes an additional engagement opening 70. The attachment base portion 52 is provided in the additional engagement opening 70 in a state where the additional wire guide 44 is attached to the first link 16. The additional wire guide 44 is positioned relative to the first link 16 by the attachment base portion 52 and the additional engagement opening 70 such that the additional wire guide 44 moves together with the first link 16 in response to a pulling force via the inner wire 5. The attachment base portion 52 is configured to prevent the additional wire guide 44 from moving relative to the first link 16.

As seen in FIG. 3, the additional wire guide 44 includes a pivot hole 72 and an attachment hole 74. The first link pin 22 extends through the pivot hole 72. The additional wire guide 44 is secured to the first body 20 by the attachment bolt 66. The attachment bolt 66 extends through the attachment hole 74 and is threadedly received in the threaded hole 68 of the first body 20. Removing the snap ring 64 and the attachment bolt 66 allows the additional wire guide 44 to be detached from the first link 16.

As seen in FIG. 3, while the wire guide 38 is attached to a rear side of the first link 16 in the axial direction of the first pivot axis A1, the wire guide 38 can be attached to a front side of the first link 16 or a middle portion of the first link 16 in the axial direction of the first pivot axis A1. Similarly, while the additional wire guide 44 is attached to the rear side of the first link 16 in the axial direction of the first pivot axis A1, the wire guide 38 can be attached to the front side of the first link 16 or the middle portion of the first link 16 in the axial direction of the first pivot axis A1.

While the position of the wire guide 38 is substantially the same as the position of the additional wire guide 44 relative to the first link 16, the position of the wire guide 38 can be different from the position of the additional wire guide 44 relative to the first link 16. For example, the wire guide 38 can be disposed on one of the front side and the rear side of the first link 16, and the additional wire guide 44 can be disposed on the other of the front side and the rear side of the first link 16. Furthermore, the wire guide 38 can be attached to one of the first link 16 and the second link 18, and the additional wire guide 44 can be attached to the other of the first link 16 and the second link 18.

With the bicycle derailleur 10, the wire guide 38 includes only one wire guiding portion 40 configured to guide the inner wire 5 of the control cable 6 which is in at least one of the top pull arrangement and the bottom pull arrangement. The wire guide 38 is a separate member from the first link 16 and is configured to be attached to the first link 16. Accordingly, it is possible to replace the wire guide 38 with another wire guide (e.g., the additional wire guide 44), or it is possible to select one of the wire guide 38 and another wire guide (e.g., the additional wire guide 44) to be attached to the same first link 16, allowing the bicycle derailleur 10 to be used for both the top pull arrangement and the bottom pull arrangement using a simple structure.

Second Embodiment

A bicycle derailleur 210 in accordance with a second embodiment will be described below referring to FIGS. 4 to 6. The bicycle derailleur 210 has the same configuration as the bicycle derailleur 10 except for the wire guide 38 and the additional wire guide 44. Thus, elements having substantially the same function as those in the first embodiment will be numbered the same here, and will not be described and/or illustrated again in detail here for the sake of brevity.

Figure 4:
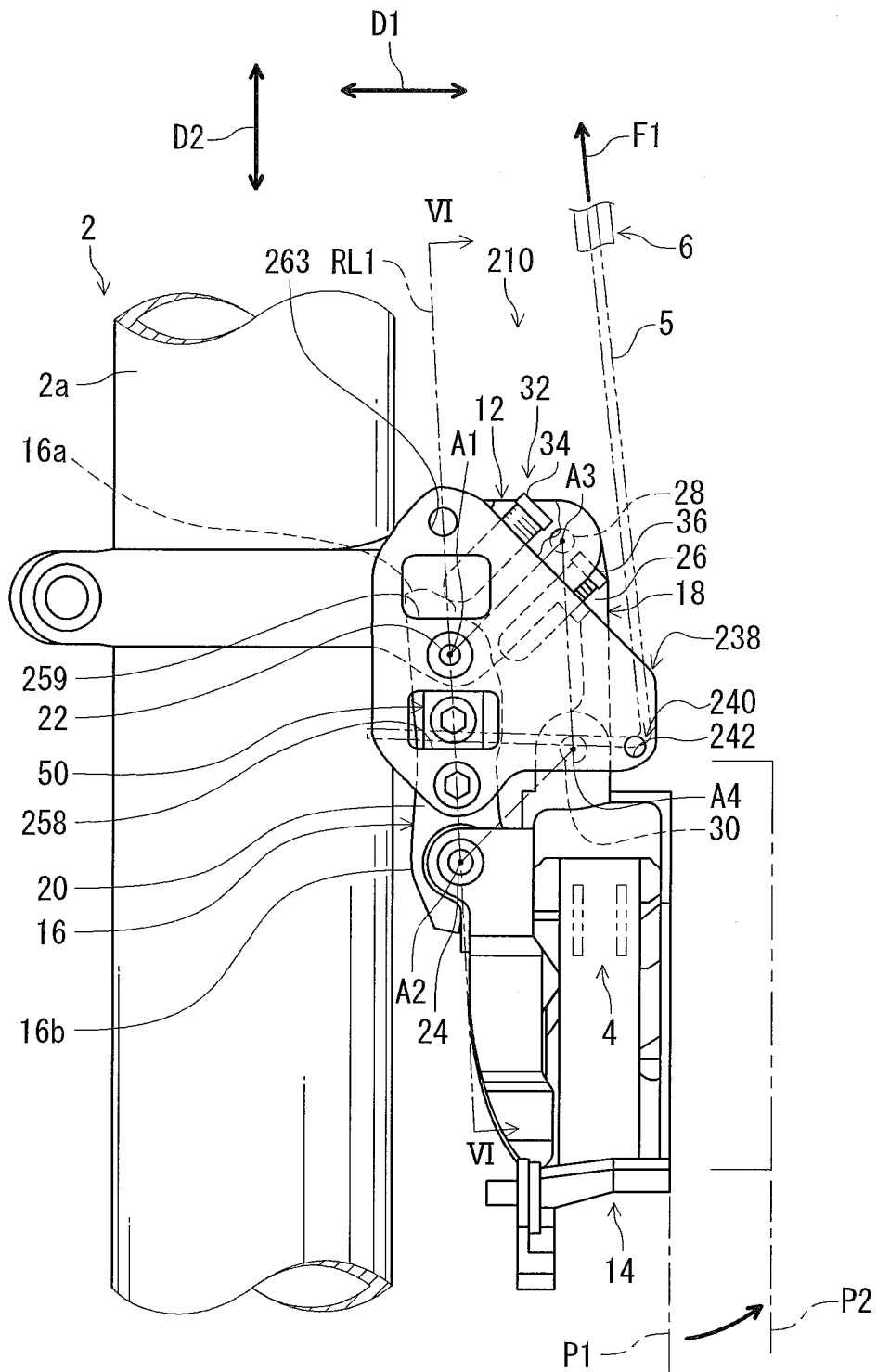
FIG. 4 is a rear side elevational view of a bicycle derailleur in accordance with a second embodiment.

As seen in FIG. 4, the bicycle derailleur 210 does not include the additional wire guide 44 in accordance with the first embodiment. The bicycle derailleur 210 comprises a wire guide 238 including only one wire guiding portion 240 configured to guide the inner wire 5 of the control cable 6 which is in at least one of the top pull arrangement and the bottom pull arrangement. In the illustrated embodiment, the wire guiding portion 240 is configured to guide the inner wire 5 of the control cable 6 which is in both the top pull arrangement and the bottom pull arrangement. The wire guide 238 is a separate member from the first link 16 and is configured to be attached to the first link 16.

Figure 5:
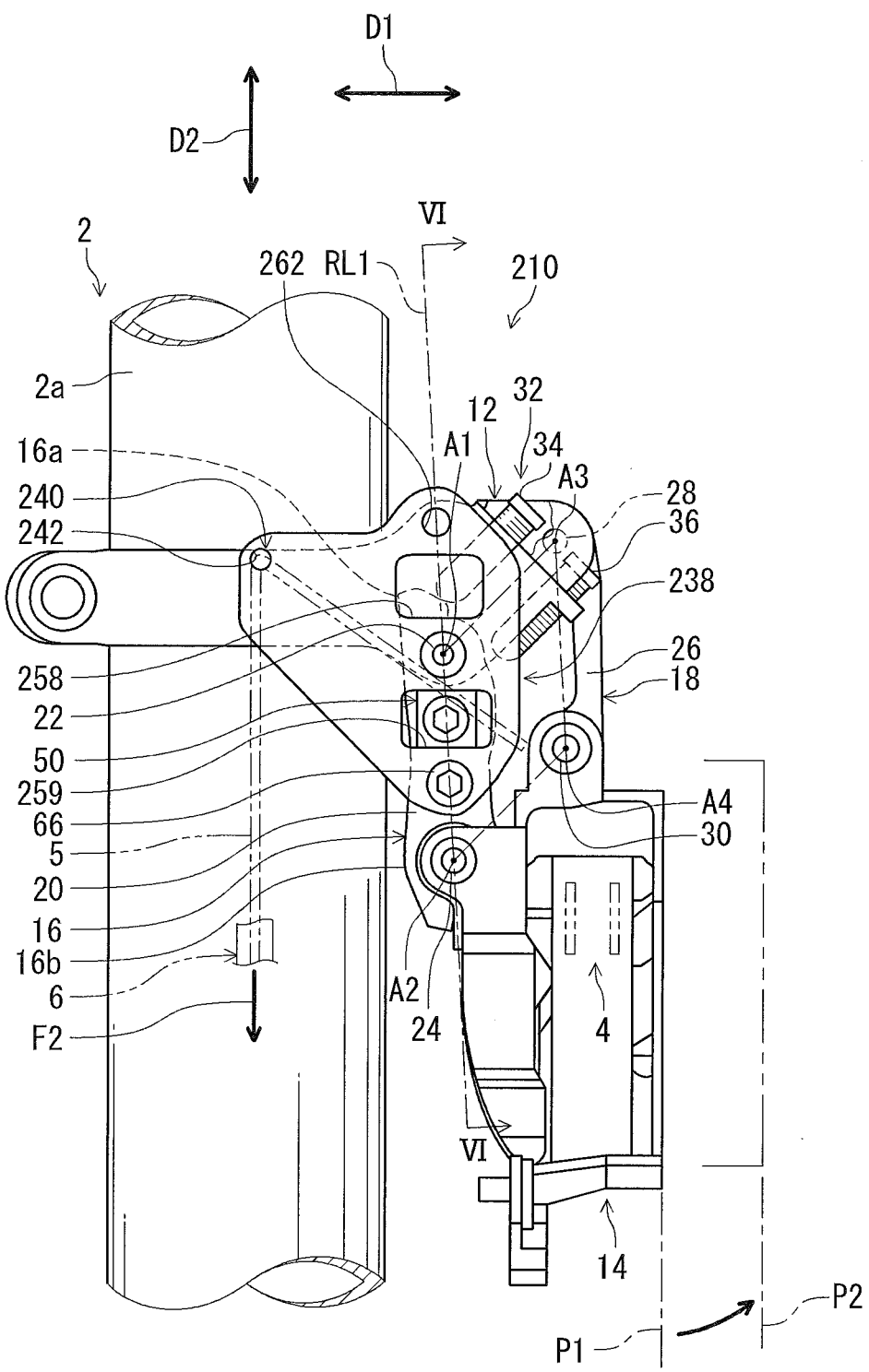
FIG. 5 is a rear side elevational view of the bicycle derailleur in accordance with the second embodiment.

As seen in FIGS. 4 and 5, the wire guide 238 is configured to be attached to the first link 16 so that the wire guide 238 is disposed at one of a first orientation (FIG. 4) and a second orientation (FIG. 5) relative to the first link 16. The wire guide 238 can be selectively attached to the first link 16 at the first orientation and the second orientation when the bicycle derailleur 210 is assembled. The wire guide 238 is configured to be detachably attached to the first link 16. However, the wire guide 238 can be non-detachably attached to the first link 16. In a case where the wire guide 238 is non-detachably attached to the first link 16, for example, the wire guide 238 is non-detachable from the first link 16 without destroying a coupling portion between the wire guide 238 and the first link 16.

The second orientation is different from the first orientation. In the illustrated embodiment, the second orientation is an orientation where the wire guide 38 is turned approximately 180 degree about a rotational axis parallel to the first pivot axis A1 relative to the first link 16 from the first orientation. More specifically, the second orientation is an orientation where the wire guide 38 is turned approximately 180 degree about the first pivot axis A1 relative to the first link 16 from the first orientation. While the rotational axis of the first and second orientations coincides with the first pivot axis A1, the rotational axis can be defined at a position other than the first pivot axis A1. For example, the rotational axis can be parallel to the second pivot axis A2 which is not parallel to the first pivot axis A1. Furthermore, the first orientation and the second orientation are not limited to the illustrated embodiment.

As seen in FIG. 4, the wire guiding portion 240 is configured to guide the inner wire 5 of the control cable 6 which is in one of the top pull arrangement and the bottom pull arrangement in a first state where the wire guide 238 is disposed at the first orientation relative to the first link 16. In the illustrated embodiment, the wire guiding portion 240 is configured to guide the inner wire 5 of the control cable 6 which is in the top pull arrangement in the first state.

As seen in FIG. 5, the wire guiding portion 240 is configured to guide the inner wire 5 of the control cable 6 which is in another of the top pull arrangement and the bottom pull arrangement in a second state where the wire guide 238 is disposed at the second orientation relative to the first link 16. In the illustrated embodiment, the wire guiding portion 240 is configured to guide the inner wire 5 of the control cable 6 which is in the bottom pull arrangement in the second state.

As seen in FIGS. 4 and 5, when viewed from the axial direction of the first pivot axis A1 (a direction perpendicular to a paper surface of each of FIGS. 4 and 5), the wire guiding portion 240 in the first state (FIG. 4) of the wire guide 238 is disposed on an opposite side of the wire guiding portion 240 in the second state (FIG. 5) of the wire guide 238 relative to the reference line RL1 extending between the first end 16a and the second end 16b. In the illustrated embodiment, when viewed from the axial direction of the first pivot axis A1, the wire guiding portion 240 in the first state of the wire guide 238 is disposed on an opposite side of the wire guiding portion 240 in the second state of the wire guide 238 relative to the first link 16.

As seen in FIGS. 4 and 5, when viewed from the axial direction of the first pivot axis A1, the position of the wire guiding portion 240 in the first state (FIG. 4) is farther from the seat tube 2a than the position of the wire guiding portion 240 in the second state (FIG. 5). Furthermore, when viewed from the axial direction of the first pivot axis A1, the position of the wire guiding portion 240 in the first state is lower than the position of the wire guiding portion 240 in the second state in the axial direction D2 of the seat tube 2a.

As seen in FIG. 4, the wire guiding portion 240 includes a guide hole 242 through which the inner wire 5 is to extend. The wire guiding portion 240 is configured to receive the upwardly pulling force F1 applied to the inner wire 5 in the first state. The first link 16 pivots relative to the base member 12 about the first pivot axis A1 in the first state in response to the upwardly pulling force F1. The wire guiding portion 240 can include at least one of a groove, a recess, and a protrusion instead of or in addition to the guide hole 242.

As seen in FIG. 5, the wire guiding portion 240 is configured to receive the downwardly pulling force F2 applied to the inner wire 5 in the second state. The first link 16 pivots relative to the base member 12 about the first pivot axis A1 in the second state in response to the downwardly pulling force F2.

Figure 6:
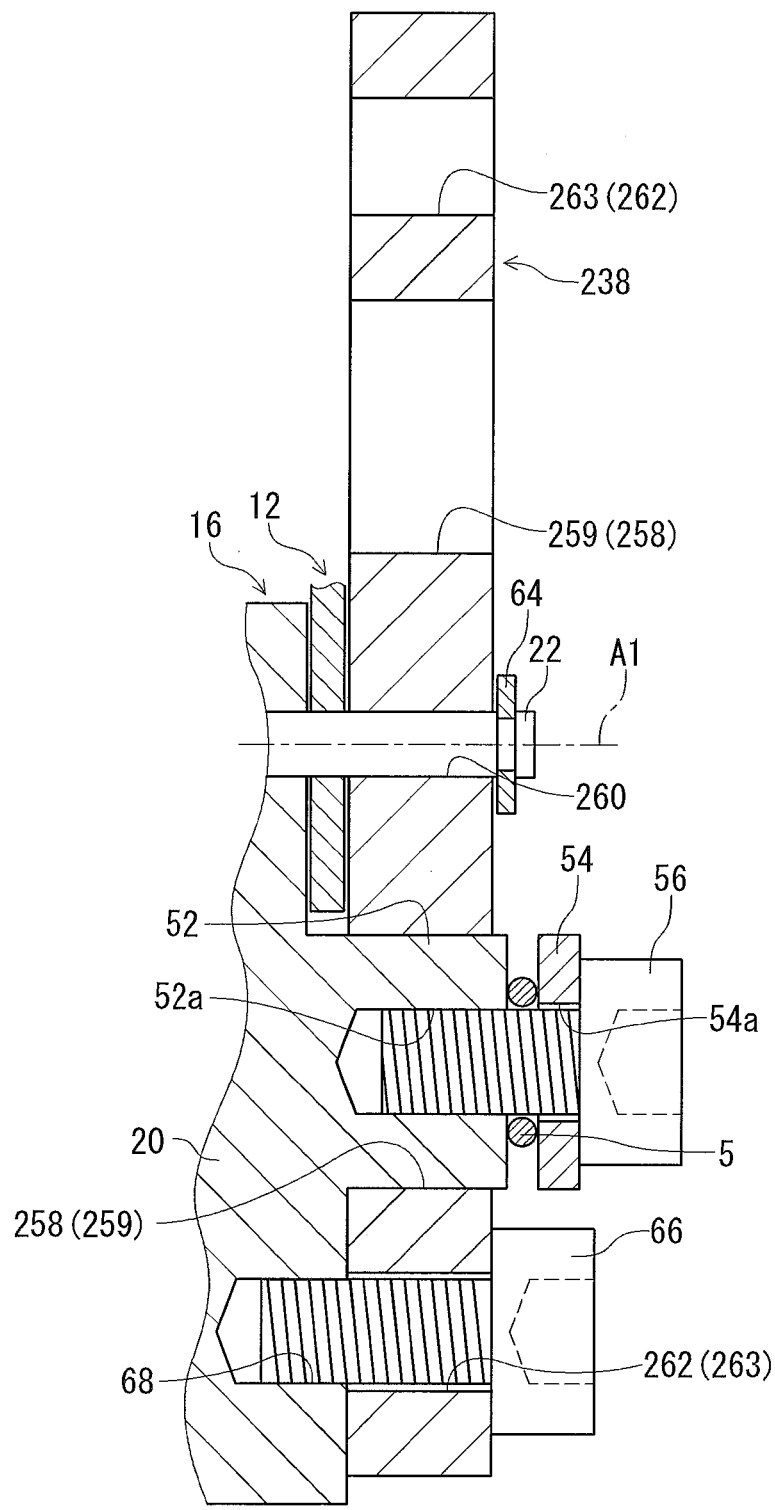
FIG. 6 is a partial cross-sectional view of the bicycle derailleur taken along line VI-VI of FIGS. 4 and 5.

As seen in FIGS. 4 and 6, the wire guide 238 includes a first engagement opening 258 and a second engagement opening 259. The attachment base portion 52 is provided in the first engagement opening 258 in the first state. The wire guide 238 is positioned relative to the first link 16 by the attachment base portion 52 and the first engagement opening 258 in the first state. The attachment base portion 52 is configured to prevent the wire guide 238 from moving relative to the first link 16 in the first state.

As seen in FIGS. 5 and 6, the attachment base portion 52 is provided in the second engagement opening 259 in the second state. The wire guide 238 is positioned relative to the first link 16 by the attachment base portion 52 and the second engagement opening 259 in the second state. The attachment base portion 52 is configured to prevent the wire guide 238 from moving relative to the first link 16 in the second state.

As seen in FIG. 6, the wire guide 238 includes a pivot hole 260, a first attachment hole 262, and a second attachment hole 263. The first link pin 22 extends through the pivot hole 260. The attachment bolt 66 extends through the first attachment hole 262 in the first state (FIG. 4). The attachment bolt 66 extends through the second attachment hole 263 in the second state (FIG. 5). Removing the snap ring 64 and the attachment bolt 66 allows the wire guide 238 to be detached from the first link 16 and attached to the first link 16 at one of the first orientation (FIG. 4) and the second orientation (FIG. 5). In the illustrated embodiment, as seen in FIGS. 4 and 5, the pivot hole 260 is common to the first orientation and the second orientation.

As seen in FIG. 6, while the wire guide 238 is attached to the rear side of the first link 16 in the axial direction of the first pivot axis A1, the wire guide 238 can be attached to the front side of the first link 16 or the middle portion of the first link 16 in the axial direction of the first pivot axis A1. While the position of the wire guide 238 in the first state (FIG. 4) is substantially the same as the position of the wire guide 238 in the second state (FIG. 5) relative to the first link 16, the position of the wire guide 238 in the first state can be different from the position of the wire guide 238 in the second state relative to the first link 16. For example, the wire guide 238 can be disposed on one of the front side and the rear side of the first link 16 in the first state, and the wire guide 238 can be disposed on the other of the front side and the rear side of the first link 16 in the second state. Furthermore, the wire guide 238 can be attached to the second link 18.

With the bicycle derailleur 210, it is possible to obtain substantially the same advantageous effect as that of the bicycle derailleur 10 in accordance with the first embodiment.

Third Embodiment

A bicycle derailleur 310 in accordance with a second embodiment will be described below referring to FIGS. 7 to 9. The bicycle derailleur 310 has the same configuration as the bicycle derailleur 10 except for the wire guide 38 and the additional wire guide 44. Thus, elements having substantially the same function as those in the above embodiments will be numbered the same here, and will not be described and/or illustrated again in detail here for the sake of brevity.

Figure 7:
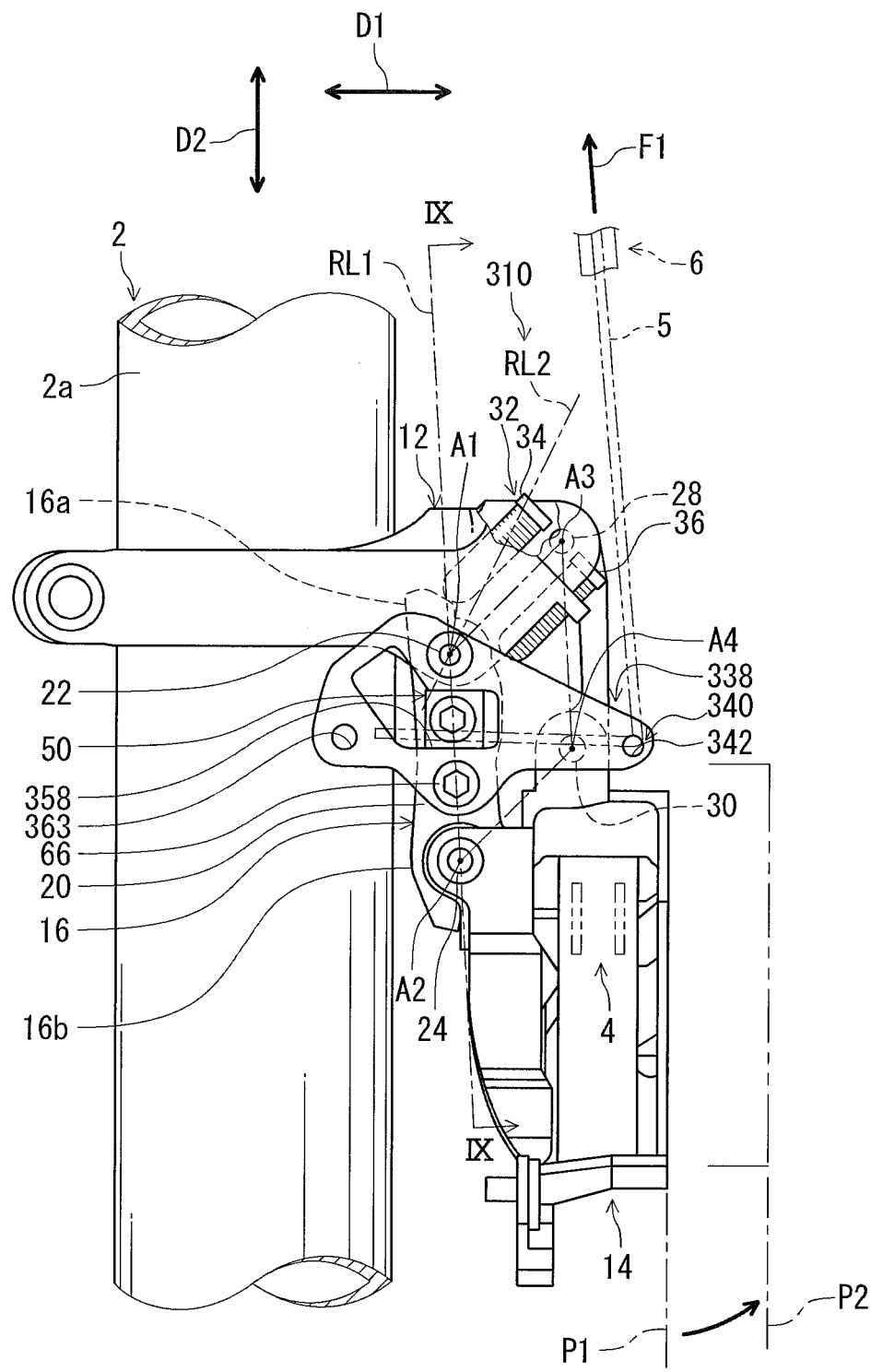
FIG. 7 is a rear side elevational view of a bicycle derailleur in accordance with a third embodiment.

As seen in FIG. 7, the bicycle derailleur 310 comprises a wire guide 338 including only one wire guiding portion 340 configured to guide the inner wire 5 of the control cable 6 which is in at least one of the top pull arrangement and the bottom pull arrangement. In the illustrated embodiment, the wire guiding portion 240 is configured to guide the inner wire 5 of the control cable 6 which is in both the top pull arrangement and the bottom pull arrangement. The wire guide 338 is a separate member from the first link 16 and is configured to be attached to the first link 16.

Figure 8:
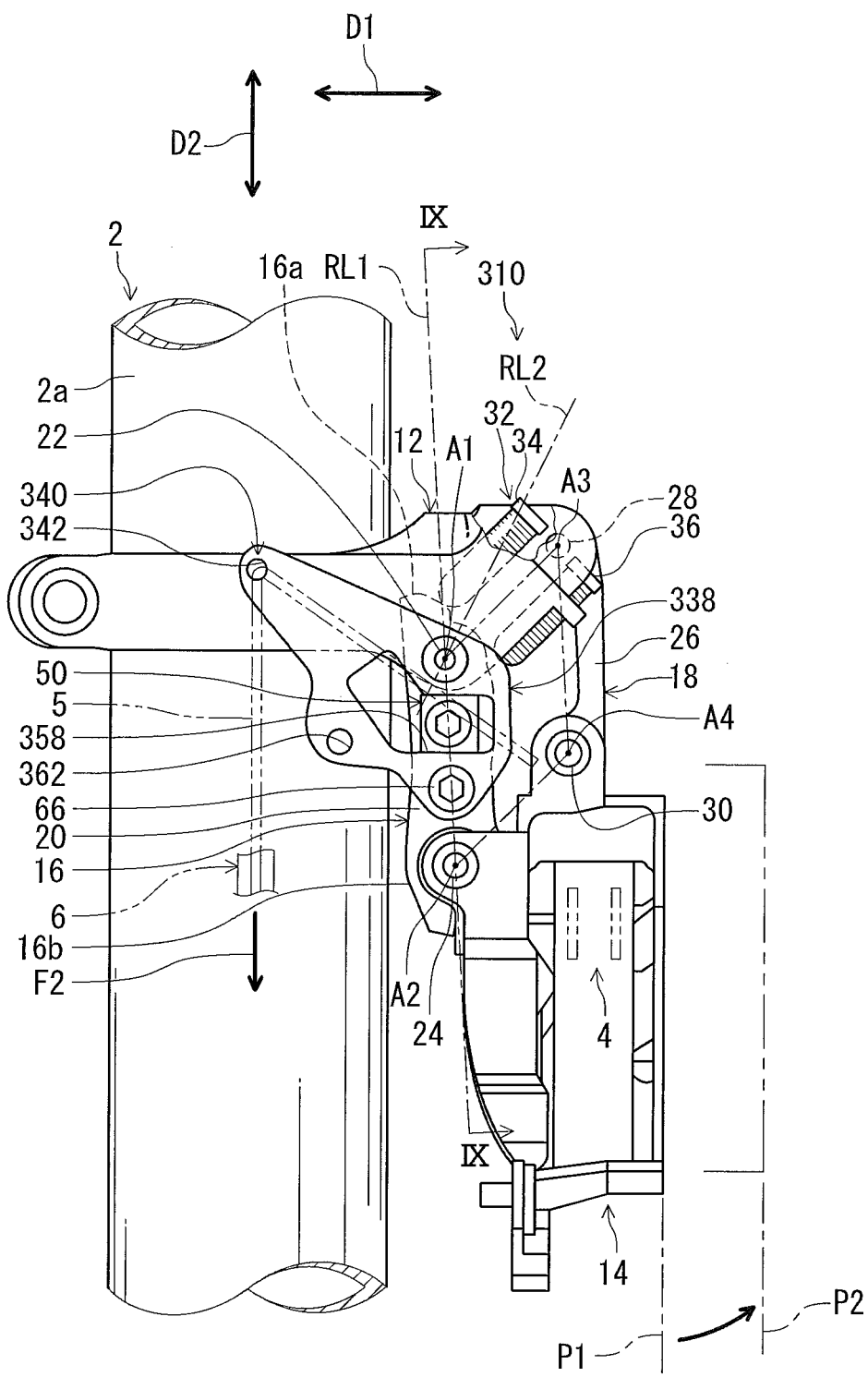
FIG. 8 is a rear side elevational view of the bicycle derailleur in accordance with the third embodiment.

As seen in FIGS. 7 and 8, the wire guide 338 is configured to be attached to the first link 16 so that the wire guide 338 is disposed at one of a first orientation (FIG. 7) and a second orientation (FIG. 8) relative to the first link 16. The wire guide 338 can be selectively attached to the first link 16 at the first orientation and the second orientation when the bicycle derailleur 310 is assembled. The wire guide 338 is configured to be detachably attached to the first link 16. However, the wire guide 338 can be non-detachably attached to the first link 16. In a case where the wire guide 338 is non-detachably attached to the first link 16, for example, the wire guide 338 is non-detachable from the first link 16 without destroying a coupling portion between the wire guide 338 and the first link 16.

The second orientation is different from the first orientation. In the illustrated embodiment, as seen in FIG. 9, the wire guide 338 includes a first side S1 and a second side S2 opposite to the first side S1 with respect to a direction parallel to the first pivot axis A1 which passes through the wire guide 338. The second orientation is an orientation where the wire guide 338 is turned over so that positions of the first side S1 and the second side S2 are replaced relative to the first link 16.

As seen in FIGS. 7 and 8, the wire guide 338 is turned over between the first orientation and the second orientation relative to a reference line RL2 when viewed from an axial direction of the first pivot axis A1 (a direction perpendicular to a paper surface of each of FIGS. 7 and 8). Namely, the reference line RL2 is a symmetrical axis of the first and second orientations of the wide guide 338. The reference line RL2 is substantially perpendicular to the first pivot axis A1. In the illustrated embodiment, the reference line RL2 is inclined relative to the reference line RL1. The reference line RL2 can coincide with the reference line RL1 if needed and/or desired.

As seen in FIG. 7, the wire guiding portion 340 is configured to guide the inner wire 5 of the control cable 6 which is in one of the top pull arrangement and the bottom pull arrangement in a first state where the wire guide 338 is disposed at the first orientation relative to the first link 16. In the illustrated embodiment, the wire guiding portion 340 is configured to guide the inner wire 5 of the control cable 6 which is in the top pull arrangement in the first state. As seen in FIG. 9, the first side S1 is opposite to the first link 16 relative to the second side S2 in the first state.

As seen in FIG. 8, the wire guiding portion 40 is configured to guide the inner wire 5 of the control cable 6 which is in another of the top pull arrangement and the bottom pull arrangement in a second state where the wire guide 338 is disposed at the second orientation relative to the first link 16. In the illustrated embodiment, the wire guiding portion 340 is configured to guide the inner wire 5 of the control cable 6 which is in the bottom pull arrangement in the second state. As seen in FIG. 9, the second side S2 is opposite to the first link 16 relative to the first side S1 in the second state.

As seen in FIGS. 7 and 8, when viewed from the axial direction of the first pivot axis A1 (a direction perpendicular to a paper surface of each of FIGS. 7 and 8), the wire guiding portion 340 in the first state of the wire guide 338 is disposed on an opposite side of the wire guiding portion 340 in the second state of the wire guide 338 relative to the reference line RL1. When viewed from the axial direction of the first pivot axis A1, the wire guiding portion 340 in the first state of the wire guide 338 is disposed on an opposite side of the wire guiding portion 340 in the second state of the wire guide 338 relative to the first link 16. Furthermore, when viewed from the axial direction of the first pivot axis A1, the wire guiding portion 340 in the first state of the wire guide 338 is disposed on an opposite side of the wire guiding portion 340 in the second state of the wire guide 338 relative to the reference line RL2.

As seen in FIGS. 7 and 8, when viewed from the axial direction of the first pivot axis A1, the position of the wire guiding portion 340 in the first state (FIG. 7) is farther from the seat tube 2a than the position of the wire guiding portion 340 in the second state (FIG. 8). Furthermore, when viewed from the axial direction of the first pivot axis A1, the position of the wire guiding portion 340 in the first state is lower than the position of the wire guiding portion 340 in the second state in the axial direction D2 of the seat tube 2a.

As seen in FIG. 7, the wire guiding portion 340 includes a guide hole 342 through which the inner wire 5 is to extend. The wire guiding portion 340 is configured to receive the upwardly pulling force F1 applied to the inner wire 5 in the first state. The first link 16 pivots relative to the base member 12 about the first pivot axis A1 in the first state in response to the upwardly pulling force F1. The wire guiding portion 340 can include at least one of a groove, a recess, and a protrusion instead of or in addition to the guide hole 342.

As seen in FIG. 8, the wire guiding portion 340 is configured to receive the downwardly pulling force F2 applied to the inner wire 5 in the second state. The first link 16 pivots relative to the base member 12 about the first pivot axis A1 in the second state in response to the downwardly pulling force F2.

Figure 9:
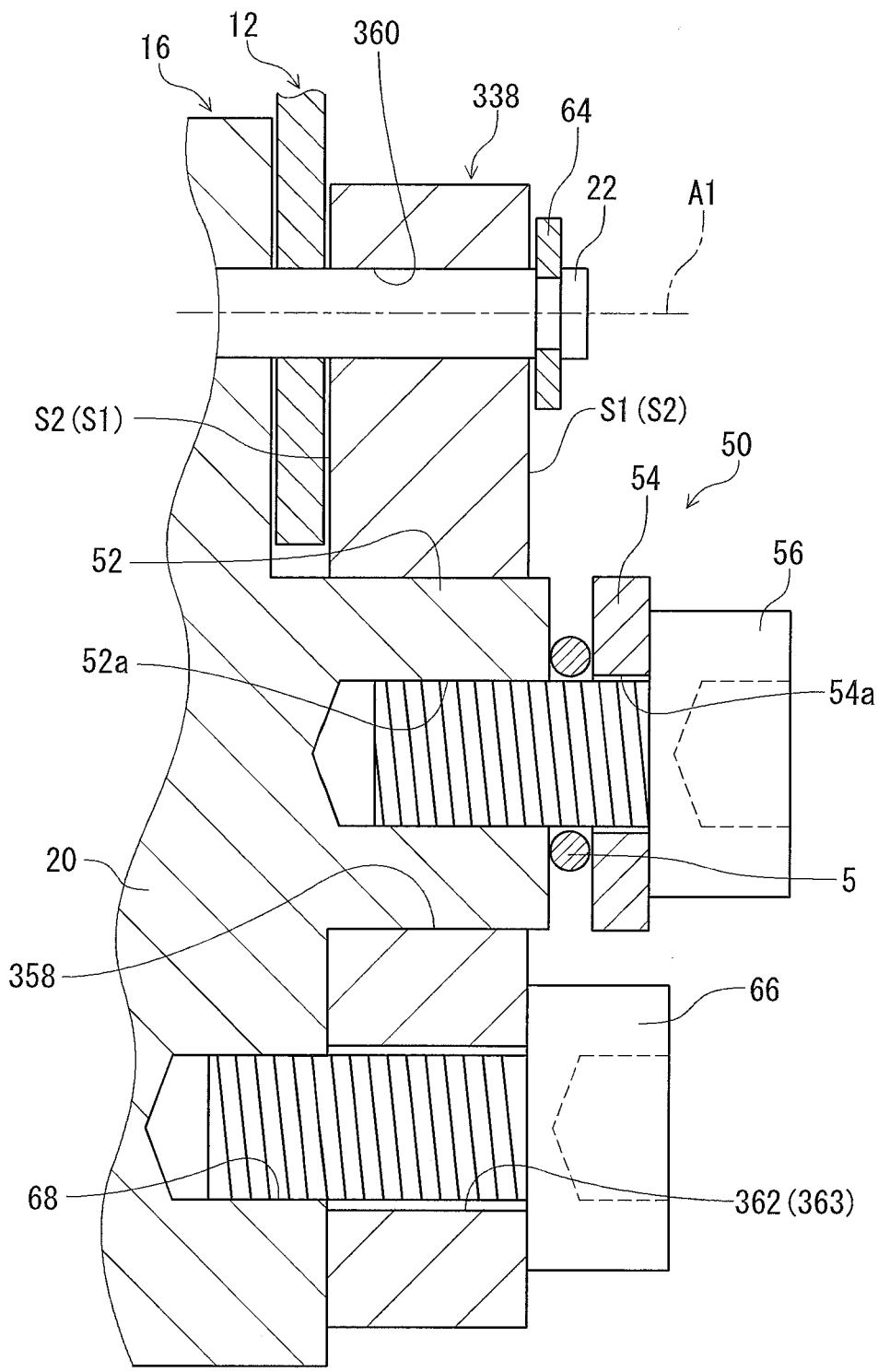
FIG. 9 is a partial cross-sectional view of the bicycle derailleur taken along line IX-IX of FIGS. 7 and 8.

As seen in FIGS. 7 to 9, the wire guide 338 includes an engagement opening 358. As seen in FIGS. 7 and 9, the attachment base portion 52 is provided in the engagement opening 358 in the first state. The wire guide 338 is positioned relative to the first link 16 by the attachment base portion 52 and the engagement opening 358 in the first state. The attachment base portion 52 is configured to prevent the wire guide 338 from moving relative to the first link 16 in the first state.

As seen in FIGS. 8 and 9, the attachment base portion 52 is provided in the engagement opening 358 in the second state. The wire guide 338 is positioned relative to the first link 16 by the attachment base portion 52 and the engagement opening 358 in the second state. The attachment base portion 52 is configured to prevent the wire guide 338 from moving relative to the first link 16 in the second state.

As seen in FIG. 9, the wire guide 338 includes a pivot hole 360, a first attachment hole 362, and a second attachment hole 363. The first link pin 22 extends through the pivot hole 360. The attachment bolt 66 extends through the first attachment hole 362 in the first state (FIG. 7). The attachment bolt 66 extends through the second attachment hole 363 in the second state (FIG. 8). Removing the snap ring 64 and the attachment bolt 66 allows the wire guide 338 to be detached from the first link 16 and attached to the first link 16 at one of the first orientation (FIG. 7) and the second orientation (FIG. 8). In the illustrated embodiment, as seen in FIGS. 7 and 8, the pivot hole 360 is common to the first orientation and the second orientation. However, the pivot hole in the first orientation can be different from the pivot hole in the second orientation.

As seen in FIG. 9, while the wire guide 338 is attached to the rear side of the first link 16 in the axial direction of the first pivot axis A1, the wire guide 338 can be attached to the front side of the first link 16 or the middle portion of the first link 16 in the axial direction of the first pivot axis A1. While the position of the wire guide 338 in the first state (FIG. 7) is substantially the same as the position of the wire guide 338 in the second state (FIG. 8) relative to the first link 16, the position of the wire guide 338 in the first state can be different from the position of the wire guide 338 in the second state relative to the first link 16. For example, the wire guide 338 can be disposed on one of the front side and the rear side of the first link 16 in the first state, and the wire guide 338 can be disposed on the other of the front side and the rear side of the first link 16 in the second state. Furthermore, the wire guide 338 can be attached to the second link 18.

With the bicycle derailleur 310, it is possible to obtain substantially the same advantageous effect as that of the bicycle derailleur 10 in accordance with the first embodiment.

Fourth Embodiment

A bicycle derailleur 410 in accordance with a fourth embodiment will be described below referring to FIGS. 10 to 12. The bicycle derailleur 410 has the same configuration as the bicycle derailleur 10 except for the wire guide 38 and the additional wire guide 44. Thus, elements having substantially the same function as those in the above embodiments will be numbered the same here, and will not be described and/or illustrated again in detail here for the sake of brevity.

Figure 10:
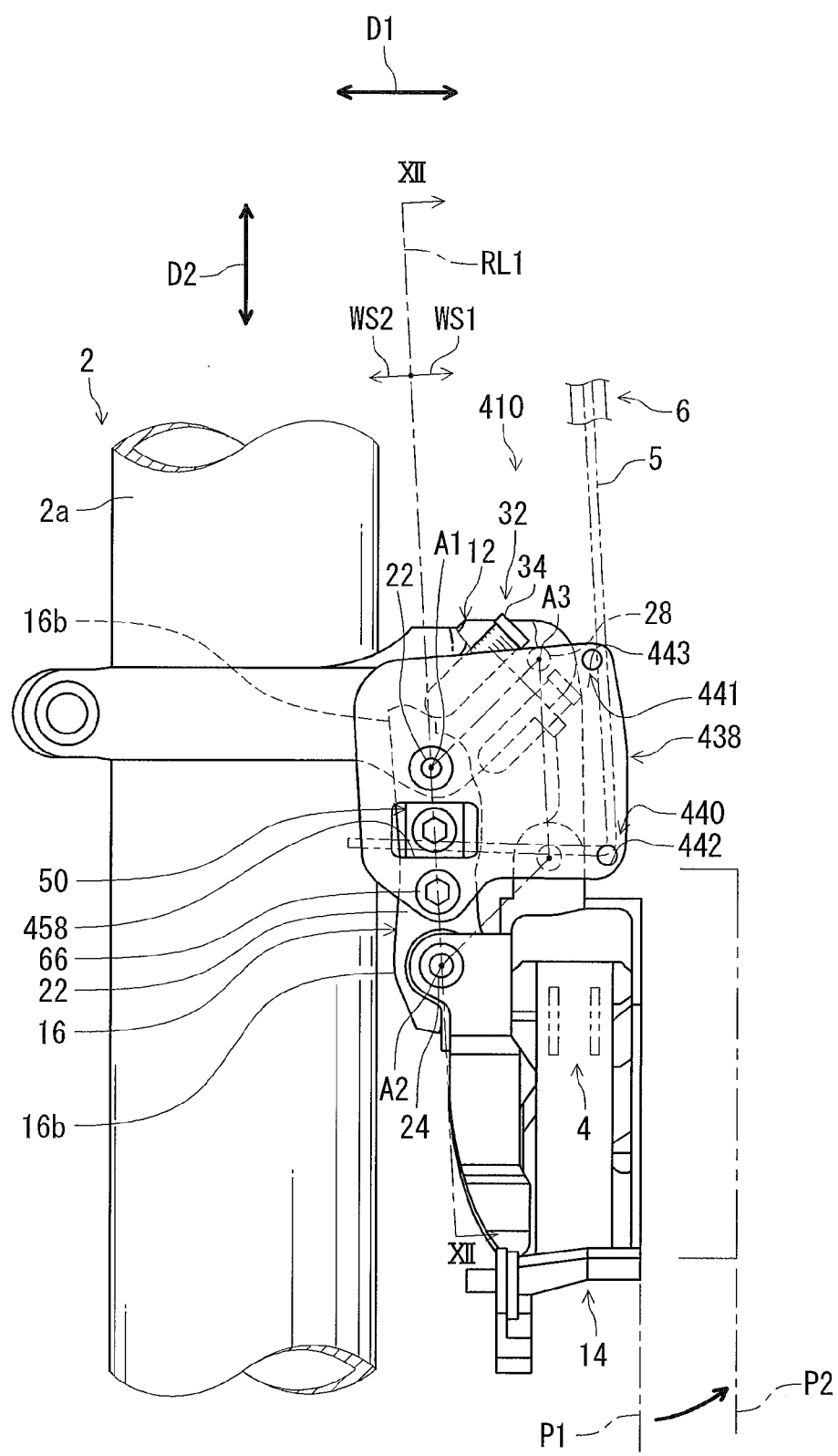
FIG. 10 is a rear side elevational view of a bicycle derailleur in accordance with a fourth embodiment.
Figure 11:
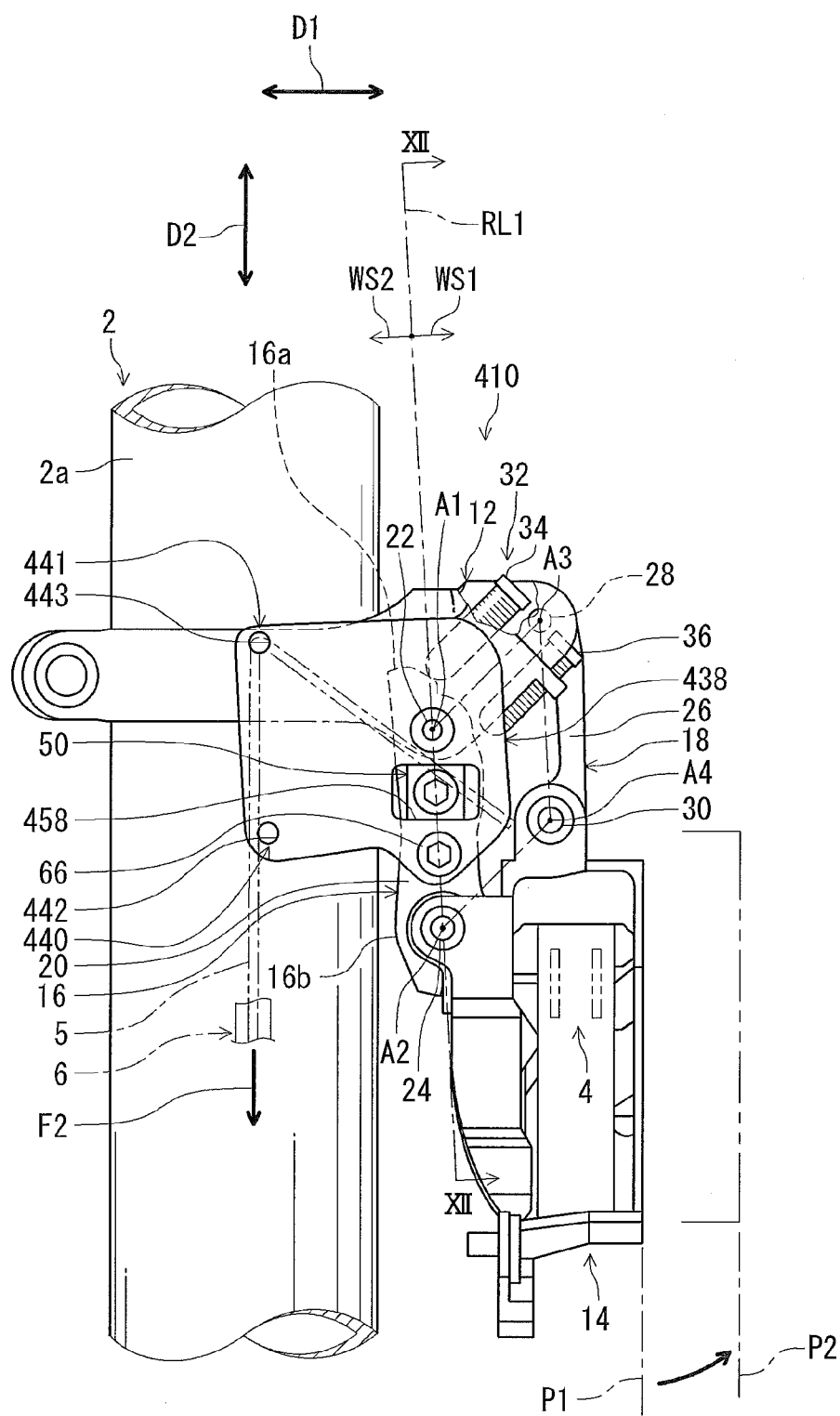
FIG. 11 is a rear side elevational view of the bicycle derailleur in accordance with the fourth embodiment.

As seen in FIGS. 10 and 11, the bicycle derailleur 410 comprises a wire guide 438 which is a separate member from the first link 16. The wire guide 438 is configured to be attached to the first link 16 so that the wire guide 438 is disposed at one of a first orientation (FIG. 10) and a second orientation (FIG. 11) relative to the first link 16. The wire guide 438 can be selectively attached to the first link 16 at the first orientation and the second orientation when the bicycle derailleur 410 is assembled. The second orientation is different from the first orientation. The wire guide 438 is configured to be detachably attached to the first link 16. However, the wire guide 438 can be configured to be non-detachably attached to the first link 16. In a case where the wire guide 438 is non-detachably attached to the first link 16, for example, the wire guide 438 is non-detachable from the first link 16 without destroying a coupling portion between the wire guide 438 and the first link 16. The wire guide 438 includes a top-pull wire guiding portion 440 and a bottom-pull wire guiding portion 441.

As seen in FIG. 10, the top-pull wire guiding portion 440 is configured to guide the inner wire 5 of the control cable 6 in a first state where the wire guide 438 is at the first orientation relative to the first link 16. The top-pull wire guiding portion 440 is configured to receive the upwardly pulling force F1 applied to the inner wire 5 in the first state. The first link 16 pivots relative to the base member 12 about the first pivot axis A1 in the first state in response to the upwardly pulling force F1.

As seen in FIG. 11, the bottom-pull wire guiding portion 441 is configured to guide the inner wire 5 of the control cable 6 in a second state where the wire guide 438 is at the second orientation relative to the first link 16. The bottom-pull wire guiding portion 441 is configured to receive the downwardly pulling force F2 applied to the inner wire 5 in the second state. The first link 16 pivots relative to the base member 12 about the first pivot axis A1 in the second state in response to the downwardly pulling force F2.

As seen in FIGS. 10 and 11, the bottom-pull wire guiding portion 441 is different from the top-pull wire guiding portion 440. The bottom-pull wire guiding portion 441 is separately provided from the top-pull wire guiding portion 440. At least one of the top-pull wire guiding portion 440 and the bottom-pull wire guiding portion 441 includes a guide hole through which the inner wire 5 is to extend.

In the illustrated embodiment, as seen in FIG. 10, the top-pull wire guiding portion 440 includes a guide hole 442 through which the inner wire 5 is to extend. As seen in FIG. 11, the bottom-pull wire guiding portion 441 includes a guide hole 443 through which the inner wire 5 is to extend. The guide hole 443 is separately provided from the guide hole 442 and is not connected with the guide hole 442. However, the guide hole 443 can be connected with the guide hole 442 to provide a single opening if needed and/or desired. The top-pull wire guiding portion 440 can include at least one of a groove, a recess, and a protrusion instead of or in addition to the guide hole 442. The bottom-pull wire guiding portion 441 can include at least one of a groove, a recess, and a protrusion instead of or in addition to the guide hole 443.

As seen in FIG. 10, when viewed from an axial direction of the first pivot axis, the top-pull wire guiding portion 440 and the bottom-pull wire guiding portion 441 are disposed on a first wire side WS1 relative to the reference line RL1 extending between the first end 16a and the second end 16b in the first state.

As seen in FIG. 11, when viewed from an axial direction of the first pivot axis, the top-pull wire guiding portion 440 and the bottom-pull wire guiding portion 441 are disposed on a second wire side WS2 relative to the reference line RL1 in the second state. The second wire side WS2 is opposite to the first wire side WS1 relative to the reference line RL1.

As seen in FIGS. 10 and 11, when viewed from the axial direction of the first pivot axis A1, the position of the wire guiding portion 440 in the first state (FIG. 10) is farther from the seat tube 2a than the position of the wire guiding portion 440 in the second state (FIG. 11). Furthermore, when viewed from the axial direction of the first pivot axis A1, the position of the wire guiding portion 440 in the first state is lower than the position of the wire guiding portion 440 in the second state in the axial direction D2 of the seat tube 2a.

Figure 12:
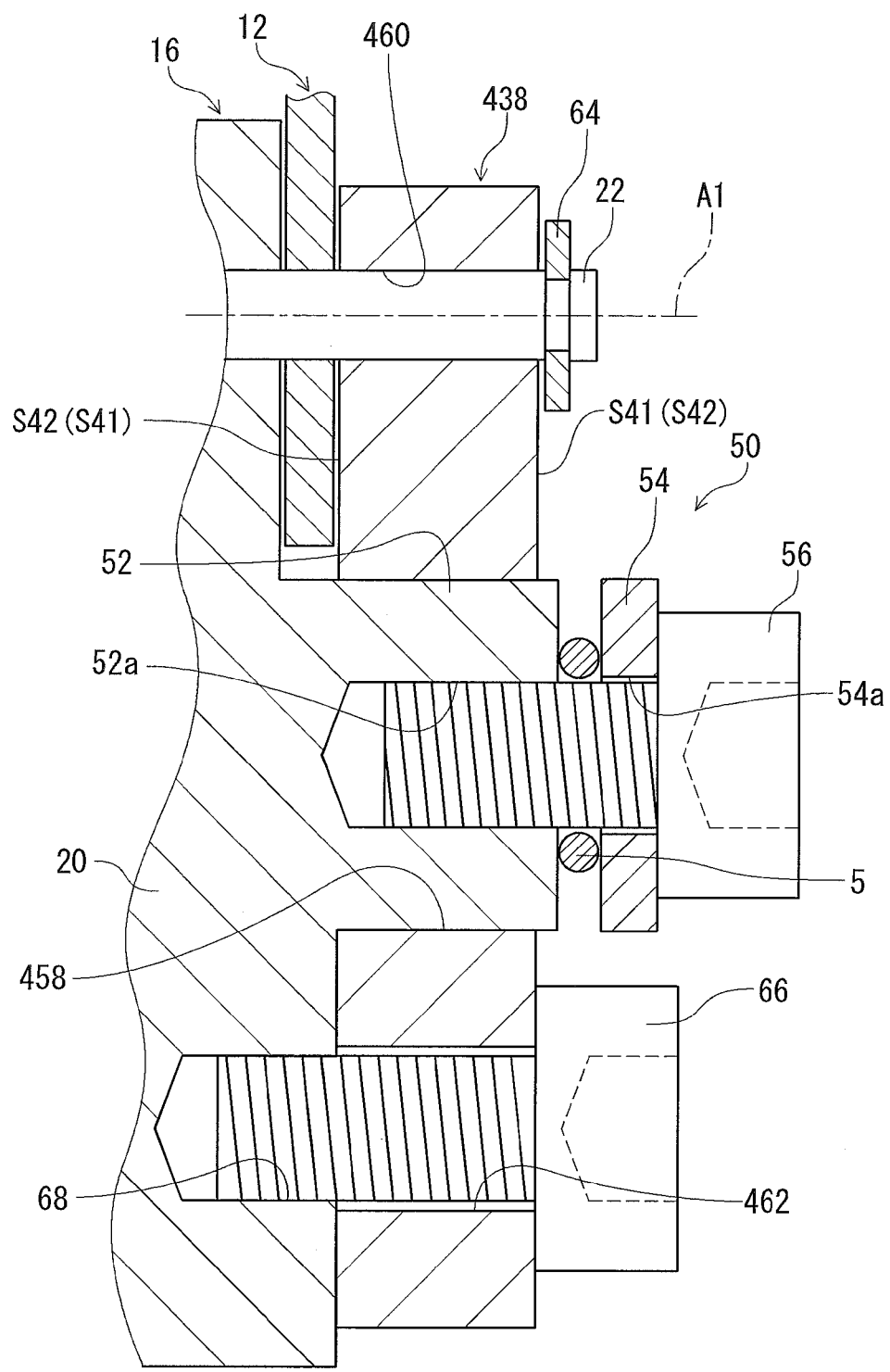
FIG. 12 is a partial cross-sectional view of the bicycle derailleur taken along line XII-XII of FIGS. 10 and 11.

In the illustrated embodiment, as seen in FIG. 12, the wire guide 438 includes a first side S41 and a second side S42 opposite to the first side S41. The second orientation is an orientation where the wire guide 438 is turned over so that positions of the first side S41 and the second side S42 are replaced relative to the first link 16. The first side S41 is opposite to the first link 16 relative to the second side S42 in the first state (FIG. 10). The second side S42 is opposite to the first link 16 relative to the first side S41 in the second state (FIG. 11).

As seen in FIGS. 10 and 11, the wire guide 338 is turned over between the first orientation and the second orientation relative to the reference line RL1 when viewed from an axial direction of the first pivot axis A1 (a direction perpendicular to a paper surface of each Of FIGS. 10 and 11). Namely, the reference line RL1 is a symmetrical axis of the first and second orientations of the wire guide 338. The wire guide 338 can be turned over between the first orientation and the second orientation relative to a line other than the reference line RL1 (e.g., a line which is substantially perpendicular to the first pivot axis A1).

As seen in FIGS. 10 and 12, the wire guide 438 includes an engagement opening 458. The attachment base portion 52 is provided in the engagement opening 458 in the first state. The wire guide 438 is positioned relative to the first link 16 by the attachment base portion 52 and the engagement opening 458 in the first state. The attachment base portion 52 is configured to prevent the wire guide 438 from moving relative to the first link 16 in the first state.

As seen in FIGS. 11 and 12, the attachment base portion 52 is provided in the engagement opening 458 in the second state. The wire guide 438 is positioned relative to the first link 16 by the attachment base portion 52 and the engagement opening 458 in the second state. The attachment base portion 52 is configured to prevent the wire guide 438 from moving relative to the first link 16 in the second state.

As seen in FIG. 12, the wire guide 438 includes a pivot hole 460 and an attachment hole 462. The first link pin 22 extends through the pivot hole 460. The attachment bolt 66 extends through the attachment hole 462 in the first state (FIG. 10). The attachment bolt 66 extends through the attachment hole 462 in the second state (FIG. 11). Removing the snap ring 64 and the attachment bolt 66 allows the wire guide 438 to be detached from the first link 16 and attached to the first link 16 at one of the first orientation (FIG. 10) and the second orientation (FIG. 11).

As seen in FIG. 12, while the wire guide 438 is attached to the rear side of the first link 16 in the axial direction of the first pivot axis A1, the wire guide 438 can be attached to the front side of the first link 16 or the middle portion of the first link 16 in the axial direction of the first pivot axis A1. While the position of the wire guide 438 in the first state (FIG. 10) is substantially the same as the position of the wire guide 438 in the second state (FIG. 11) relative to the first link 16, the position of the wire guide 438 in the first state can be different from the position of the wire guide 438 in the second state relative to the first link 16. For example, the wire guide 438 can be disposed on one of the front side and the rear side of the first link 16 in the first state, and the wire guide 438 can be disposed on the other of the front side and the rear side of the first link 16 in the second state. Furthermore, the wire guide 438 can be attached to the second link 18.

With the bicycle derailleur 410, it is possible to obtain substantially the same advantageous effect as that of the bicycle derailleur 10 in accordance with the first embodiment.

Fifth Embodiment

A bicycle derailleur 510 in accordance with a fifth embodiment will be described below referring to FIGS. 13 and 14. The bicycle derailleur 510 has the same configuration as the bicycle derailleur 10 except for the wire guiding portion. Thus, elements having substantially the same function as those in the above embodiments will be numbered the same here, and will not be described and/or illustrated again in detail here for the sake of brevity.

Figure 13:
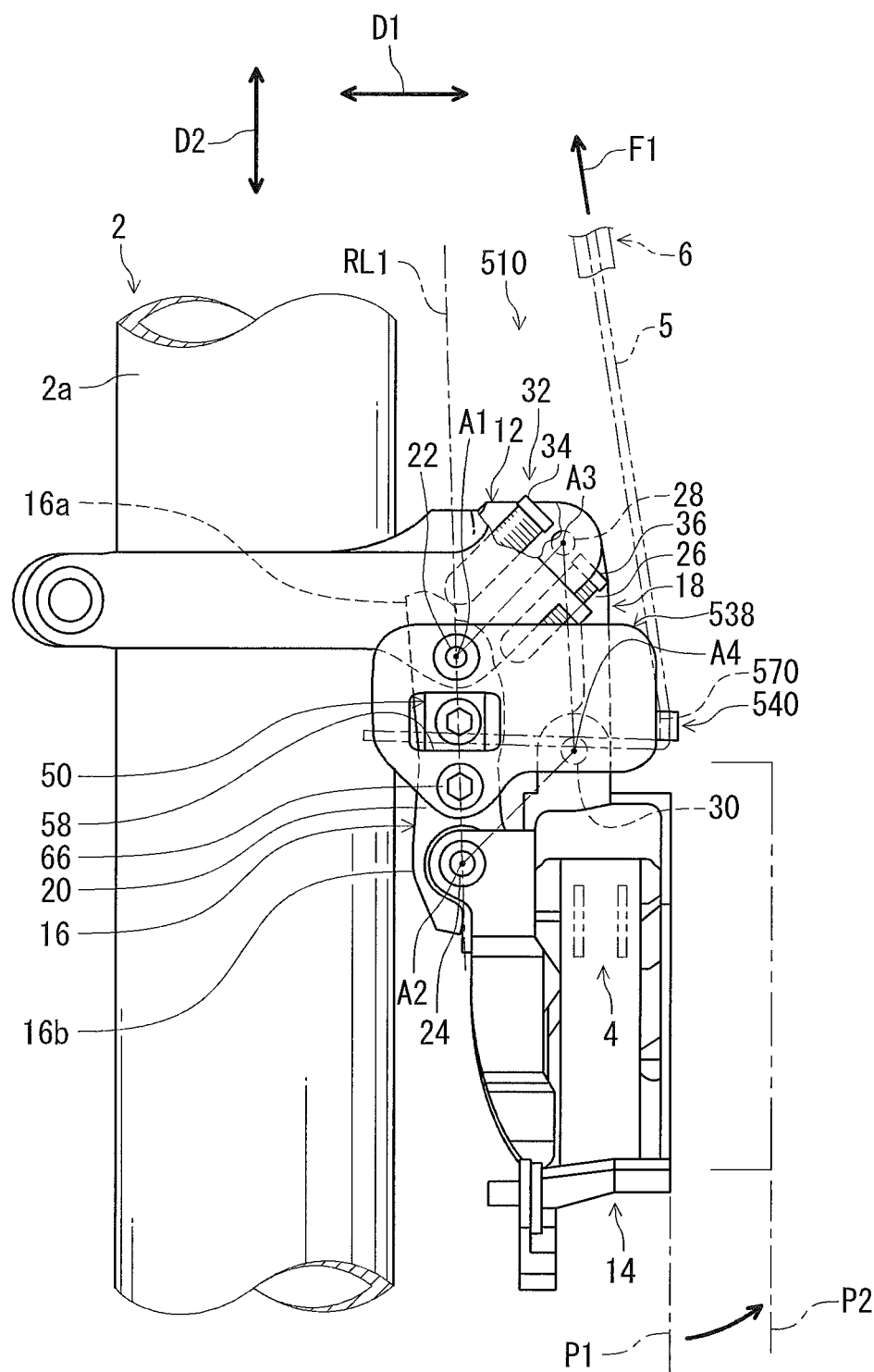
FIG. 13 is a rear side elevational view of a bicycle derailleur in accordance with a fifth embodiment.
Figure 14:
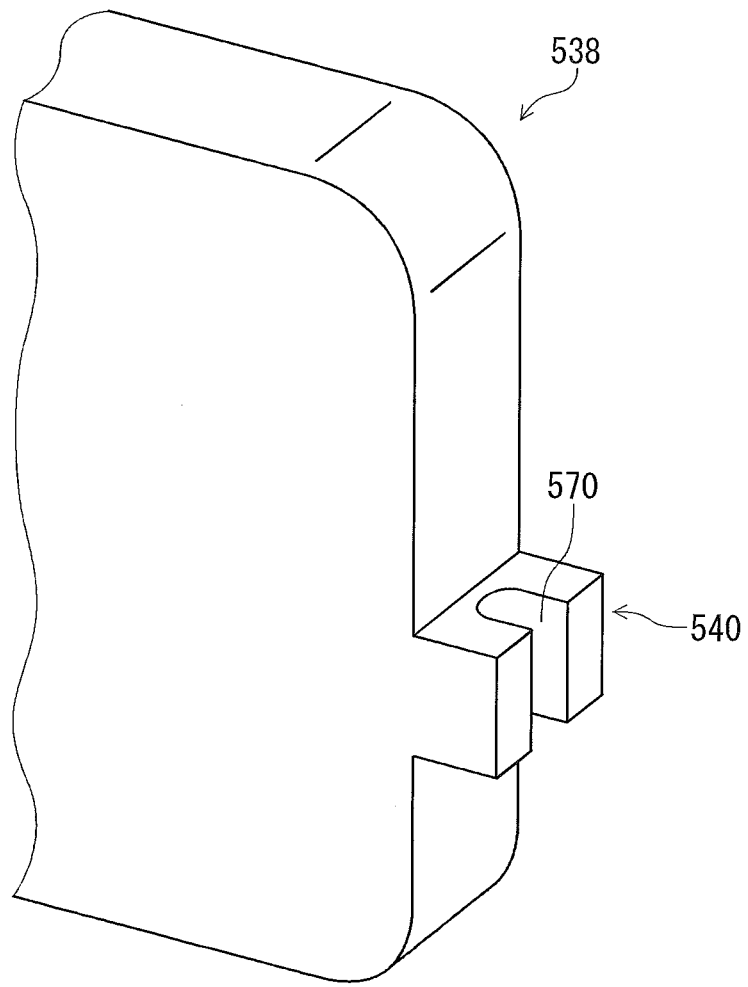
FIG. 14 is a partial perspective view of a wire guide of the bicycle derailleur illustrated in FIG. 13.

As seen in FIGS. 13 and 14, the bicycle derailleur 510 comprises a wire guide 538 including a wire guiding portion 540. Unlike the wire guiding portion 40 in accordance with the first embodiment, the wire guiding portion 540 includes a guide groove 570 through which the inner wire 5 is to extend. The wire guiding portion 540 is configured to receive the upwardly pulling force F1 applied to the inner wire 5 via the guide groove 570. The construction of the wire guiding portion 540 is not limited to the illustrated embodiment. The wire guiding portion 540 can include a guide hole and a guide groove if needed and/or desired. The guide groove 570 can be applied to the additional wire guide 44 in accordance with the first embodiment instead of the additional guide hole 48 (FIG. 2). Furthermore, the guide groove 570 can be applied to the wire guides in accordance with the first to fourth embodiments instead of the guide holes. Since the wire guide 538 has the same structure as that of the wire guide 40 in accordance with the first embodiment except for the wire guide portion 540, it will not be described in detail here for the sake of brevity.

With the bicycle derailleur 510, it is possible to obtain substantially the same advantageous effect as that of the bicycle derailleur 10 in accordance with the first embodiment.

Sixth Embodiment

A bicycle derailleur 610 in accordance with a sixth embodiment will be described below referring to FIGS. 15 to 17. The bicycle derailleur 610 has the same configuration as the bicycle derailleur 410 except for the wire guiding portion. Thus, elements having substantially the same function as those in the above embodiments will be numbered the same here, and will not be described and/or illustrated again in detail here for the sake of brevity.

Figure 15:
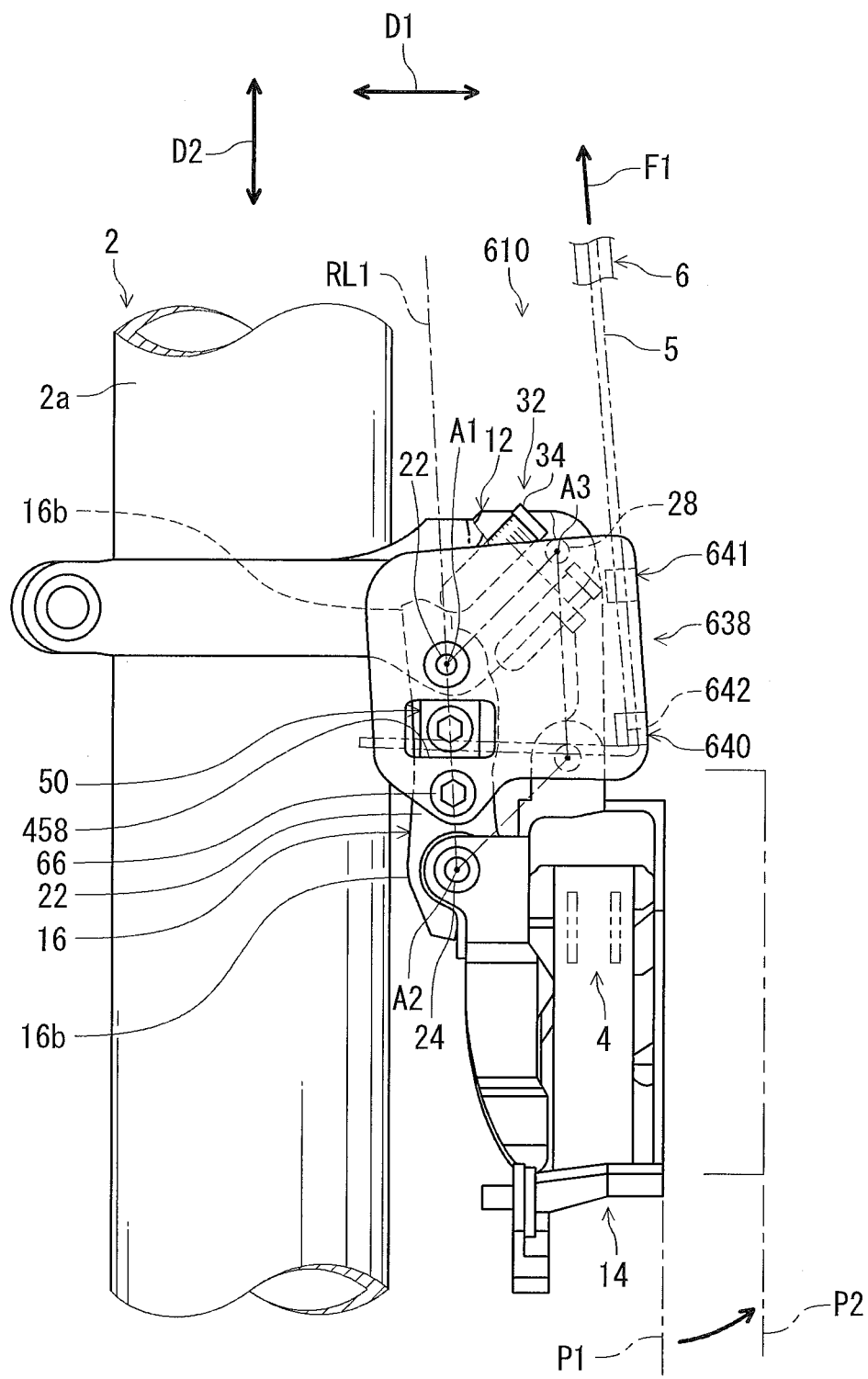
FIG. 15 is a rear side elevational view of a bicycle derailleur in accordance with a sixth embodiment.
Figure 16:
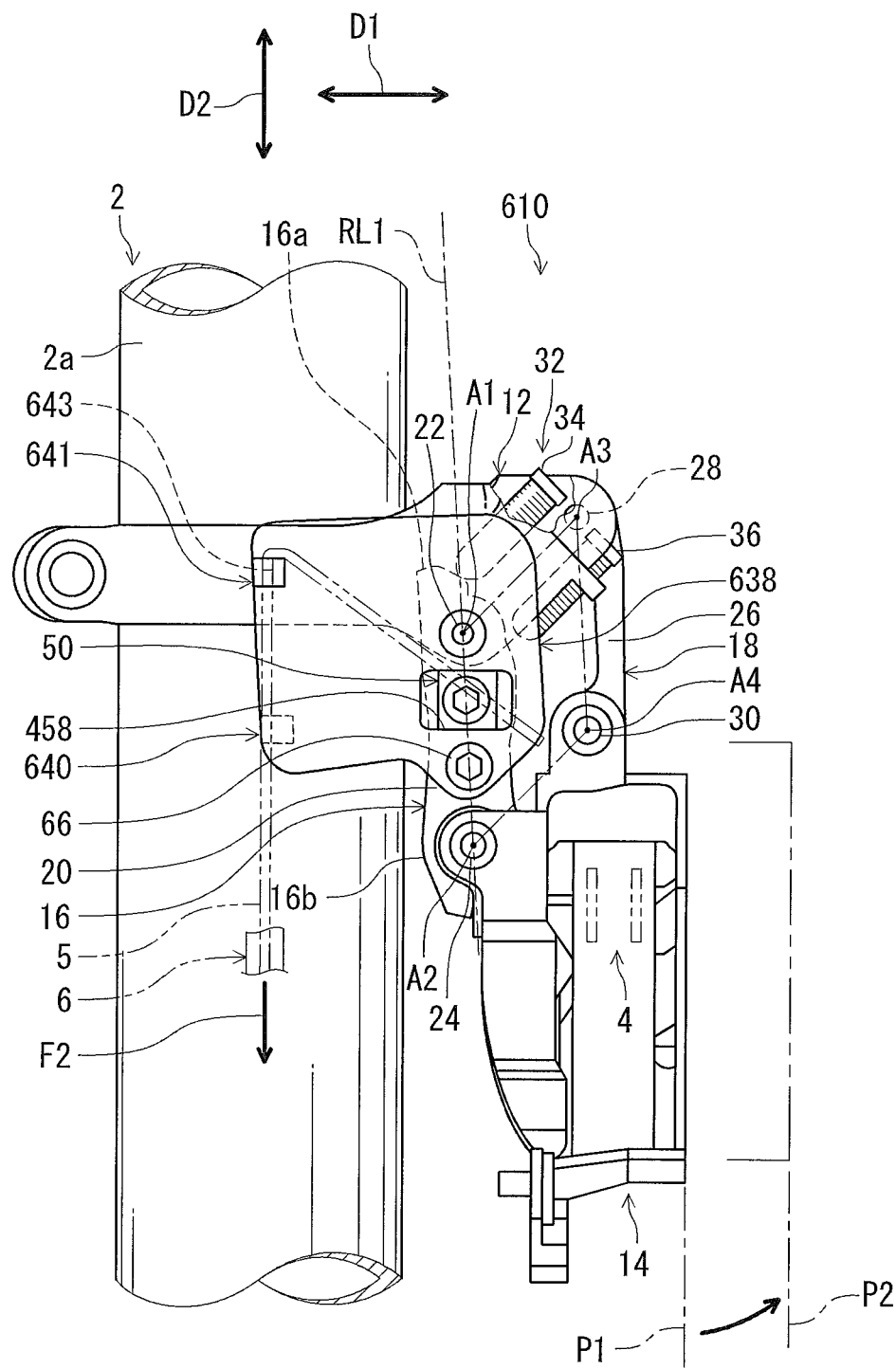
FIG. 16 is a rear side elevational view of the bicycle derailleur in accordance with the sixth embodiment.
Figure 17:
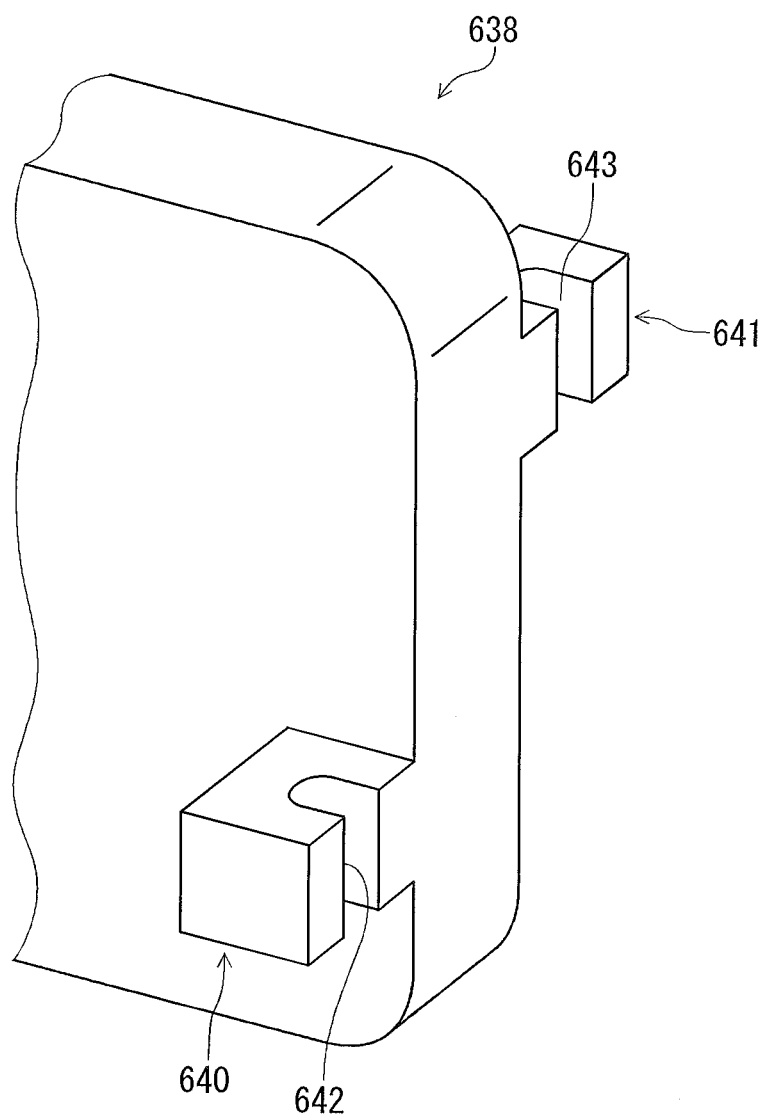
FIG. 17 is a partial perspective view of a wire guide of the bicycle derailleur illustrated in FIG. 15.

As seen in FIGS. 15 to 17, the bicycle derailleur 610 comprises a wire guide 638 including a top-pull wire guiding portion 640 and a bottom-pull wire guiding portion 641. Unlike the wire guide 438 in accordance with the fourth embodiment, at least one of the top-pull wire guiding portion 640 and the bottom-pull wire guiding portion 641 includes a guide groove through which the inner wire 5 is to extend. In the illustrated embodiment, the top-pull wire guiding portion 640 includes a guide groove 642 through which the inner wire 5 is to extend. The bottom-pull wire guiding portion 641 includes a guide groove 643 through which the inner wire 5 is to extend. Since the wire guide 638 has the same structure as that of the wire guide 438 in accordance with the fourth embodiment except for the top-pull wire guiding portion 440 and the bottom-pull wire guiding portion 441, it will not be described in detail here for the sake of brevity.

As seen in FIG. 15, the top-pull wire guiding portion 640 is configured to receive the upwardly pulling force F1 applied to the inner wire 5 via the guide groove 642. As seen in FIG. 16, the bottom-pull wire guiding portion 641 is configured to receive the downwardly pulling force F2 applied to the inner wire 5 via the guide groove 643. At least one of the top-pull wire guiding portion 640 and the bottom-pull wire guiding portion 641 can include a guide hole and a guide groove if needed and/or desired.

With the bicycle derailleur 610, it is possible to obtain substantially the same advantageous effect as that of the bicycle derailleur 10 in accordance with the first embodiment.

It will be apparent to those skilled in the bicycle field from the present disclosure that the above embodiments can be at least partially combined with each other. Furthermore, while the wire guide in accordance with each of the above embodiments is integrally provided as a single unitary member, such wire guides can include a plurality of parts if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a base member configured to be coupled to a bicycle frame;
a chain guide configured to guide a bicycle chain;
a first link configured to couple the chain guide to the base member so that the chain guide is movable relative to the base member between a retracted position and an extended position; and
one of a wire guide and an additional wire guide which are separate members from the first link and which are selectively attached to the first link, the wire guide including a wire guiding portion configured to guide an inner wire of a control cable which is in a top pull arrangement, the additional wire guide including an additional wire guiding portion configured to guide an inner wire of a control cable which is in a bottom pull arrangement.

2. The bicycle derailleur according to claim 1, wherein the wire guide and the additional wire guide are configured to be detachably attached to the first link to be replaceable with each other.

3. The bicycle derailleur according to claim 1, wherein the wire guide is configured to be detachably attached to the first link to be replaceable with another wire guide.

4. The bicycle derailleur according to claim 1, wherein
the wire guide is configured to be attached to the first link so that the wire guide is disposed at one of a first orientation and a second orientation relative to the first link,
the second orientation is different from the first orientation,
the wire guiding portion is configured to guide the inner wire of the control cable which is in one of the top pull arrangement and the bottom pull arrangement in a first state where the wire guide is disposed at the first orientation relative to the first link, and
the wire guiding portion is configured to guide the inner wire of the control cable which is in another of the top pull arrangement and the bottom pull arrangement in a second state where the wire guide is disposed at the second orientation relative to the first link.

5. The bicycle derailleur according to claim 4, wherein
the first link includes
a first end configured to be pivotally coupled to the base member about a first pivot axis, and
a second end configured to be pivotally coupled to the chain guide about a second pivot axis, and
when viewed from an axial direction of the first pivot axis, the wire guiding portion in the first state of the wire guide is disposed on an opposite side of the wire guiding portion in the second state of the wire guide relative to a reference line extending between the first end and the second end.

6. The bicycle derailleur according to claim 5, wherein the second orientation is an orientation where the wire guide is turned approximately 180 degree about a rotational axis parallel to the first pivot axis relative to the first link from the first orientation.

7. The bicycle derailleur according to claim 4, wherein
the wire guide includes a first side and a second side opposite to the first side, and
the second orientation is an orientation where the wire guide is turned over so that positions of the first side and the second side are replaced relative to the first link.

8. The bicycle derailleur according to claim 1, wherein the wire guiding portion includes a guide hole through which the inner wire is to extend.

9. The bicycle derailleur according to claim 1, wherein the wire guiding portion includes a guide groove through which the inner wire is to extend.

10. A bicycle derailleur comprising:
a base member configured to be coupled to a bicycle frame;

a chain guide configured to guide a bicycle chain;

a first link configured to couple the chain guide to the base member so that the chain guide is movable relative to the base member between a retracted position and an extended position; and a wire guide which is a separate member from the first link, the wire guide being configured to be attached to the first link so that the wire guide is disposed at one of a first orientation and a second orientation relative to the first link, the second orientation being different from the first orientation, the wire guide including a top-pull wire guiding portion configured to guide an inner wire of a control cable in a first state where the wire guide is at the first orientation relative to the first link, and a bottom-pull wire guiding portion configured to guide the inner wire of the control cable in a second state where the wire guide is at the second orientation relative to the first link, the bottom-pull wire guiding portion being different from the top-pull wire guiding portion.

11. The bicycle derailleur according to claim 10, wherein the first link includes a first end configured to be pivotally coupled to the base member about a first pivot axis, and a second end configured to be pivotally coupled to the chain guide about a second pivot axis, when viewed from an axial direction of the first pivot axis, the top-pull wire guiding portion and the bottom-pull wire guiding portion are disposed on a first wire side relative to a reference line extending between the first end and the second end in the first state, when viewed from the axial direction of the first pivot axis, the top-pull wire guiding portion and the bottom-pull wire guiding portion are disposed on a second wire side relative to the reference line in the second state, and the second wire side is opposite to the first wire side relative to the reference line.

12. The bicycle derailleur according to claim 10, wherein the wire guide includes a first side and a second side opposite to the first side, and the second orientation is an orientation where the wire guide is turned over so that positions of the first side and the second side are replaced relative to the first link.

13. The bicycle derailleur according to claim 10, wherein at least one of the top-pull wire guiding portion and the bottom-pull wire guiding portion includes a guide hole through which the inner wire is to extend.

14. The bicycle derailleur according to claim 10, wherein at least one of the top-pull wire guiding portion and the bottom-pull wire guiding portion includes a guide groove through which the inner wire is to extend.

15. The bicycle derailleur according to claim 1, wherein the wire guide includes an engagement opening, the additional wire guide includes an additional engagement opening, and the first link includes an attachment structure including an attachment base portion, the attachment base portion being configured to be provided in one of the engagement opening and the additional engagement opening in a state where the one of the wire guide and the additional wire guide is attached to the first link.

16. The bicycle derailleur according to claim 15, wherein the attachment base portion is configured to prevent the one of the wire guide and the additional wire guide from moving relative to the first link.

17. The bicycle derailleur according to claim 1, wherein the wire guide includes a pivot hole, the additional wire guide includes an additional pivot hole, and the first link includes a first body and a first link pin that is configured to pivotally connect the first body to the base member and configured to extend through one of the pivot hole and the additional pivot hole in a state where the one of the wire guide and the additional wire guide is attached to the first link.

18. The bicycle derailleur according to claim 1, wherein the one of the wire guide and the additional wire guide is configured to be non-detachably attached to the first link.

19. The bicycle derailleur according to claim 1, wherein the wire guiding portion includes a guide hole through which the inner wire is to extend.

20. The bicycle derailleur according to claim 19, wherein the additional wire guiding portion includes an additional guide hole through which the inner wire is to extend.

* * * * *